(12) United States Patent
Dasilva

(10) Patent No.: US 10,467,867 B2
(45) Date of Patent: Nov. 5, 2019

(54) TECHNOLOGIES FOR POINT-OF-SALE TRANSACTIONS

(71) Applicant: LIGHTSPEED POS INC., Montreal (CA)

(72) Inventor: Dax Dasilva, Montreal (CA)

(73) Assignee: LIGHTSPEED POS INC., Montreal, QC (CA)

( * ) Notice: Subject to any disclaimer, the term of this patent is extended or adjusted under 35 U.S.C. 154(b) by 18 days.

(21) Appl. No.: 15/310,646

(22) PCT Filed: May 12, 2015

(86) PCT No.: PCT/CA2015/050428
§ 371 (c)(1),
(2) Date: Nov. 11, 2016

(87) PCT Pub. No.: WO2015/172247
PCT Pub. Date: Nov. 19, 2015

(65) Prior Publication Data
US 2017/0076560 A1 Mar. 16, 2017

Related U.S. Application Data

(60) Provisional application No. 61/992,469, filed on May 13, 2014.

(51) Int. Cl.
*G07G 1/12* (2006.01)
*G06Q 20/02* (2012.01)
(Continued)

(52) U.S. Cl.
CPC .............. *G07G 1/12* (2013.01); *G06Q 10/06* (2013.01); *G06Q 20/02* (2013.01); *G06Q 20/20* (2013.01);
(Continued)

(58) Field of Classification Search
CPC ........ G07G 1/12; G07G 1/01; G06Q 30/0643; G06Q 30/0633; G06Q 10/06; G06Q 30/06; G06Q 20/20; G06Q 20/02
See application file for complete search history.

(56) References Cited

U.S. PATENT DOCUMENTS 6,073,119 A 6/2000 Bornemisaz-Wahr et al.
6,317,722 B1 11/2001 Jacobi et al.
(Continued)

OTHER PUBLICATIONS

Screenshot from "Add a Logo to Open Source Point of Sale". Published to https://www.youtube.com/watch?v=YOJ6vN717vk by freecas2 on Dec. 6, 2011.*

(Continued)

*Primary Examiner* — Nathan A Mitchell
(74) *Attorney, Agent, or Firm* — Barnes & Thornburg LLP

(57) ABSTRACT

Technologies for conducting a sales transaction on a mobile point-of-sale computing device include displaying a branded background image associated with a business entity conducting the sales transaction on a display of the mobile point-of-sale computing device and displaying a point-of-sale user interface overlaid on the branded background image. The point-of-sale user interface includes several semi-transparent display windows. A portion of the branded background image is visible through each of the semi-transparent display windows. A portion of the branded background image covered by at least one of the semitransparent display windows is blurred to increase the visibility of information included in the blurred semitransparent display window. Technologies for updating inventory items using tag information are also disclosed. The tag information may include, for example, relational data tags that identified other inventory items related to the associated inventory (Continued)

item and/or description data tags that identify characteristics of the associated inventory item.

25 Claims, 25 Drawing Sheets

(51) Int. Cl.
*G06Q 20/20* (2012.01)
*G06Q 30/06* (2012.01)
*G06Q 10/06* (2012.01)
*G07G 1/01* (2006.01)

(52) U.S. Cl.
CPC ......... *G06Q 30/06* (2013.01); *G06Q 30/0633* (2013.01); *G06Q 30/0643* (2013.01); *G07G 1/01* (2013.01)

(56) References Cited

U.S. PATENT DOCUMENTS

| | | | |
|---|---|---|---|
| 7,529,687 B1* | 5/2009 | Phan | G06Q 20/201 705/14.67 |
| 7,739,613 B2 | 6/2010 | Lindsay | |
| 9,916,568 B2* | 3/2018 | Vodopia | G06Q 20/20 |
| 2003/0167206 A1 | 9/2003 | Shirai | |
| 2005/0240480 A1* | 10/2005 | Ito | G06Q 20/20 705/16 |
| 2008/0016451 A1 | 1/2008 | Funabashi et al. | |
| 2008/0307342 A1* | 12/2008 | Furches | G06T 11/00 715/764 |
| 2009/0132938 A1* | 5/2009 | Gardner | G06Q 30/02 715/762 |
| 2009/0171798 A1* | 7/2009 | Sasaki | G06Q 20/204 705/17 |
| 2010/0250399 A1* | 9/2010 | Williams | G06Q 30/0601 705/26.1 |
| 2011/0153393 A1 | 6/2011 | Raff et al. | |
| 2011/0218872 A1* | 9/2011 | Richelson | G06Q 20/20 705/18 |
| 2011/0231272 A1* | 9/2011 | Englund | G06Q 20/20 705/21 |
| 2011/0302051 A1 | 12/2011 | Arbatli | |
| 2013/0080289 A1* | 3/2013 | Roy | G06Q 10/10 705/26.8 |
| 2013/0144736 A1* | 6/2013 | Vodopia | G07G 1/0045 705/20 |
| 2013/0332354 A1 | 12/2013 | Rhee et al. | |
| 2014/0019274 A1* | 1/2014 | Hardin | G06Q 20/20 705/21 |
| 2014/0095481 A1 | 4/2014 | Argue et al. | |
| 2014/0122268 A1 | 5/2014 | Argue et al. | |
| 2015/0019356 A1* | 1/2015 | Bagdonas | G06Q 30/0238 705/21 |
| 2015/0278787 A1* | 10/2015 | Takasu | G07G 1/14 705/24 |
| 2017/0068945 A1* | 3/2017 | Tsuchimochi | G07G 1/12 |
| 2018/0096328 A1* | 4/2018 | Cummins | G06Q 30/02 |

OTHER PUBLICATIONS

"User Manual for version 4.24 of the PosPRO Till". By inepro. 2012.*
"QuickBooks Point of Sale User Guide". By Intuit. 2010.*
Ishak, Edward W., et al., "Interacting with Hidden Content Using Content-Aware Free-Space Transparency," UIST 04, Oct. 24-27, 2004, Sante Fe, NM, USA, vol. 6, Issue 2, pp. 189-192.
European Search Report for Patent Application No. 15793536.2-1958, dated Sep. 29, 2017, 9 pages.
International Search Repot and Written Opinion for Application No. PCT/CA2015/050428, dated Jul. 27, 2015, 10 pages.
European Examination Report for Application No. 15793536.2-122, dated Dec. 18, 2018, 9 pages.

* cited by examiner

TECHNOLOGIES FOR POINT-OF-SALE TRANSACTIONS

CROSS-REFERENCE TO RELATED APPLICATION

The present application is the U.S. national phase of PCT/CA2015/050428, filed on May 12, 2015. PCT/CA2015/050428 claims priority under 35 U.S.C. § 119(e) to U.S. Provisional Patent Application Ser. No. 61/992,469, entitled "TECHNOLOGIES FOR POINT-OF-SALE TRANSACTIONS," which was filed on May 13, 2014

BACKGROUND

Point-of-sale devices are commercial devices used by retailers to conduct sale transactions with customers. Typical point-of-sale devices are stationary devices, such as electronic or manual cash registers, used to complete the sale transaction with the customer. More advanced point-of-sale devices may be computerized and include additional devices such as scales to weigh items, barcode scanners, touchscreens, and the like. In some implementations, the stationary point-of-sale devices may be interconnected with each other to provide further functionality such as inventory management.

Cloud-based point-of-sale systems provide point-of-sale functionality as a software-as-a-service. Cloud-based point-of-sale systems may differ from stand-alone point-of-sale devices in that most, if not all, of the commercial data related to the sales transactions is stored in the cloud and accessed by the point-of-sale devices on an as-needed basis. For example, inventory data, past sales transaction data, and other commercial data may be stored in the cloud (e.g., on an associated server). As such, the cloud-based point-of-sale system provides a centralized repository for the commercial data, which may be accessed from various locations. Additionally, because the cloud-based point-of-sale systems are typically implemented as a software-as-a-service, cloud-based point-of-sale systems are generally platform independent.

SUMMARY

According to an aspect of the present disclosure, a mobile point-of-sale computing device for conducting a sales transaction may include a display, a background display module, an overlay display module, and a background blur module. The background display module may be configured to display a background image on the display. The background image being associated with a business entity conducting the sales transaction and selected from a plurality of background images. The overlay display module may be configured to display a point-of-sale user interface overlaid on the background image. The point-of-sale user interface may be usable to conduct a sales transaction and may include a plurality of semi-transparent display windows. A portion of the background image may be visible through each of the semi-transparent display windows. The background blur module may be configured to blur a portion of the background image covered by at least one of the semitransparent display windows to increase the visibility of information included in the blurred semitransparent display window.

In some embodiments, the mobile point-of-sale computing device may also include a communication module to retrieve the background image from a point-of-sale server over a network. Additionally, in some embodiments, the background display module may be configured to display a logo image of the business entity over the background image on the display of the mobile point-of-sale computing device. In such embodiments, the communication module may be configured to retrieve the logo image from a point-of-sale server over a network.

In some embodiments, the mobile point-of-sale computing device may also include a point-of-sale control module configured to display, on the point-of-sale graphical user interface, a plurality of inventory items on the available for purchase on the display of the mobile point-of-sale computing device, receive a selection of an inventory item for purchase via the point-of-sale graphical user interface, and add the selected inventory item to a virtual shopping cart. In such embodiments, the point-of-sale control module may be further configured to initiate a search for additional inventory items related to the selected inventory item based on a data tag associated with the selected inventory item and display, on the point-of-sale graphical user interface, additional inventory items identified by the search for additional inventory items related to the selected inventory item.

In some embodiments, the data tag may be embodied as a relational data tag that identifies other inventory items that have been determined to be related to the selected inventory item. In such embodiments, the point-of-sale control module may initiate a search for additional inventory items identified by the relational data tag of the selected inventory item. Additionally, in some embodiments, the data tag may be embodied as a description data tag that defines characteristics of the selected inventory item. In such embodiments, the point-of-sale control module may initiate a search for additional inventory items having associated description data tags defining characteristics that match the characteristics of the selected inventory item as defined by the description data tag of the selected inventory item.

In some embodiments, the mobile point-of-sale computing device may also include a point-of-sale module to display a lock screen on the display of the mobile point-of-sale computing device, receive a personal identification number from a user of the mobile point-of-sale computing device in response to display of the lock screen, and activate a user account associated with the personal identification number in response to receipt of the personal identification number. In some embodiments, the point-of-sale module may receive an alphanumeric password or other user credentials and activate a user account associated with the alphanumeric password or other user credentials. The lock screen may obscure the point-of-sale user interface. Additionally, in some embodiments, the mobile point-of-sale computing device may also include a point-of-sale module to receive a web-based inventory management interface from a point-of-sale server over a network and embed the web-based inventory management interface in the point-of-sale user interface with a communication bridge between web-based content and native content of the mobile point-of-sale computing device.

Additionally, in some embodiments, the mobile point-of-sale computing device may also include a customer-facing display and a point-of-sale module to display a customer-facing user interface on the customer-facing display. The customer-facing user interface may be overlaid on the branded background image, and the customer-facing display may be usable to conduct the sales transaction.

Accordingly to another aspect, a method for conducting a sales transaction on a mobile point-of-sale computing device may include displaying a branded background image on a display of the mobile point-of-sale computing device and displaying a point-of-sale user interface overlaid on the branded background image. The branded background image may be associated with a business entity conducting the sales transaction and selected from a plurality of branded background images. The point-of-sale user interface may be usable to conduct a sales transaction and may include a plurality of semi-transparent display windows. A portion of the branded background image may be visible through each of the semi-transparent display windows. The method may also include blurring a portion of the branded background image covered by at least one of the semitransparent display windows to increase the visibility of information included in the blurred semitransparent display window.

In some embodiments, displaying the branded background image may include retrieving the branded background image from a point-of-sale server over a network. Additionally, in some embodiments, the method may include displaying a logo image of the business entity over the branded background image on the display of the mobile point-of-sale computing device. In such embodiments, displaying the logo may include retrieving the logo image from a point-of-sale server over a network.

In some embodiments, the method may also include displaying a plurality of inventory items available for purchase on the display of the mobile point-of-sale computing device, receiving a selection of an inventory item for purchase, and adding the selected inventory item to a virtual shopping cart. Additionally, the method may include searching for additional inventory items related to the selected inventory item based on a data tag associated with the selected inventory item and displaying additional inventory items identified by the search for additional inventory items related to the selected inventory item.

In some embodiments, the data tag may be embodied as a relational data tag that identifies other inventory items that have been determined to be related to the selected inventory item. In such embodiments, searching for additional inventory items may include searching for additional inventory items identified by the relational data tag of the selected inventory item. Additionally, in some embodiments, the data tag may be embodied as a description data tag that defines characteristics of the selected inventory item. In such embodiments, searching for additional inventory items may include searching for additional inventory items having associated description data tags defining characteristics that match the characteristics of the selected inventory item as defined by the description data tag of the selected inventory item.

In some embodiments, the method may also include displaying a lock screen on the display of the mobile point-of-sale computing device, receiving a personal identification number from a user of the mobile point-of-sale computing device in response to displaying the lock screen, and activating a user account associated with the personal identification number in response to receiving the personal identification number. In some embodiments, the method may include receiving an alphanumeric password or other user credentials and activating a user account associated with the alphanumeric password or other user credentials. The lock screen may obscure the point-of-sale user interface. Additionally, in some embodiments, the method may also include receiving a web-based inventory management interface from a point-of-sale server over a network and embedding the web-based inventory management interface in the point-of-sale user interface using a communication bridge between web-based content and native content of the mobile point-of-sale computing device.

In some embodiments, the method may also include displaying a customer-facing user interface on a customer-facing display of the mobile point-of-sale computing device. The customer-facing user interface may be overlaid on the branded background image, and the customer-facing display may be usable to conduct the sales transaction.

According to a further aspect, one or more machine-readable storage media may include a plurality of instructions stored thereon that, in response to execution, cause a mobile point-of-sale computing device to display a branded background image on a display of the mobile point-of-sale computing device and display a point-of-sale user interface overlaid on the branded background image. The branded background image may be associated with a business entity conducting the sales transaction and selected from a plurality of branded background images. The point-of-sale user interface may be usable to conduct a sales transaction and includes a plurality of semi-transparent display windows. A portion of the branded background image may be visible through each of the semi-transparent display windows. Additionally, the plurality of instructions may cause the mobile point-of-sale computing device to blur a portion of the branded background image covered by at least one of the semitransparent display windows to increase the visibility of information included in the blurred semitransparent display window.

In some embodiments, to display the branded background image may include to retrieve the branded background image from a point-of-sale server over a network. Additionally, in some embodiments, the plurality of instruction may further cause the mobile point-of-sale computing device to display a logo image of the business entity over the branded background image on the display of the mobile point-of-sale computing device. In such embodiments, to display the logo may include to retrieve the logo image from a point-of-sale server over a network.

In some embodiments, the plurality of instructions may further cause the mobile point-of-sale computing device to display, by the point-of-sale graphical user interface, a plurality of inventory items available for purchase on the display of the mobile point-of-sale computing device, receive a selection of an inventory item for purchase, and add the selected inventory item to a virtual shopping cart. Additionally, the plurality of instructions may further cause the mobile point-of-sale computing device to search for additional inventory items related to the selected inventory item based on a data tag associated with the selected inventory item and display, on the mobile point-of-sale computing device, additional inventory items identified by the search for additional inventory items related to the selected inventory item.

In some embodiments, the data tag may include a relational data tag that identifies other inventory items that have been determined to be related to the selected inventory item. In such embodiments, to search for additional inventory items may include to search for additional inventory items identified by the relational data tag of the selected inventory item. Additionally, in some embodiments, the data tag may include a description data tag that defines characteristics of the selected inventory item. In such embodiments, to search for additional inventory items may include to search for additional inventory items having associated description data tags defining characteristics that match the characteristics of the selected inventory item as defined by the description data tag of the selected inventory item.

In some embodiments, the plurality of instructions may further cause the mobile point-of-sale computing device to display a lock screen on the display of the mobile point-of-sale computing device, receive a personal identification number from a user of the mobile point-of-sale computing device in response to displaying the lock screen, and activate a user account associated with the personal identification number in response to receiving the personal identification number. In some embodiments, the plurality of instructions may further cause the mobile point-of-sale computing device to receive an alphanumeric password or other user credentials and activate a user account associated with the alphanumeric password or other user credentials. The lock screen may obscure the point-of-sale user interface. Additionally, in some embodiments, the plurality of instructions may further cause the mobile point-of-sale computing device to receive a web-based inventory management interface from a point-of-sale server over a network and embed the web-based inventory management interface in the point-of-sale user interface using a communication bridge between web-based content and native content of the mobile point-of-sale computing device.

In some embodiments, the plurality of instructions may further cause the mobile point-of-sale computing device to display a customer-facing user interface on a customer-facing display of the mobile point-of-sale computing device. The customer-facing user interface may be overlaid on the branded background image, and the customer-facing display may be usable to conduct the sales transaction.

According to yet another aspect, a point-of-sale server for updating inventory of a cloud-based point-of-sale system may include a database of inventory items for sale and an inventory control module to (i) receive sale information related to an inventory item to be added to the cloud-based point-of-sale system, (ii) receive tag information associated with the inventory item, the tag information including data usable to identified other inventory items related to the inventory item to be added to the cloud-based point-of-sale system, and (iii) store, in the database, the sale information and the tag information in relation to each other.

In some embodiments, the sale information may include an image of the inventory item, description data that describes the inventory item, and/or a sale price of the inventory item. Additionally, in some embodiments, the tag information may include a relational data tag associated with the inventory item that identifies other inventory items that have been determined to be related to the inventory item to be added to the cloud-based point-of-sale system. Additionally or alternatively, the tag information may include a description data tag that defines characteristics of the inventory item to be added to the cloud-based point-of-sale system.

According to yet another aspect, a method updating inventory of a cloud-based point-of-sale system may include receiving, with a point-of-sale server, sale information related to an inventory item to be added to the cloud-based point-of-sale system; receiving, with the point-of-sale server, tag information associated with the inventory item, the tag information including data usable to identified other inventory items related to the inventory item to be added to the cloud-based point-of-sale system; and storing, in a local database of the point-of-sale server, the sale information and the tag information in relation to each other.

In some embodiments, receiving the sale information may include receiving an image of the inventory item, receiving description data that describes the inventory item, and/or receiving a sale price of the inventory item. Additionally, in some embodiments, receiving the tag information may include receiving a relational data tag associated with the inventory item that identifies other inventory items that have been determined to be related to the inventory item to be added to the cloud-based point-of-sale system. Additionally or alternatively, in some embodiments, receiving the tag information may include receiving a description data tag that defines characteristics of the inventory item to be added to the cloud-based point-of-sale system.

According to yet another aspect, one or more machine-readable storage media may include a plurality of instructions stored thereon that, in response to execution, cause a point-of-sale server to receive sale information related to an inventory item to be added to the cloud-based point-of-sale system; receive tag information associated with the inventory item, the tag information including data usable to identified other inventory items related to the inventory item to be added to the cloud-based point-of-sale system; and store, in a local database of the point-of-sale server, the sale information and the tag information in relation to each other.

In some embodiments, to receive the sale information may include to receive an image of the inventory item, to receive description data that describes the inventory item, and/or to receive a sale price of the inventory item. Additionally, in some embodiments, to receive the tag information may include to receive a relational data tag associated with the inventory item that identifies other inventory items that have been determined to be related to the inventory item to be added to the cloud-based point-of-sale system. Additionally or alternatively, to receive the tag information may include to receive a description data tag that defines characteristics of the inventory item to be added to the cloud-based point-of-sale system.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
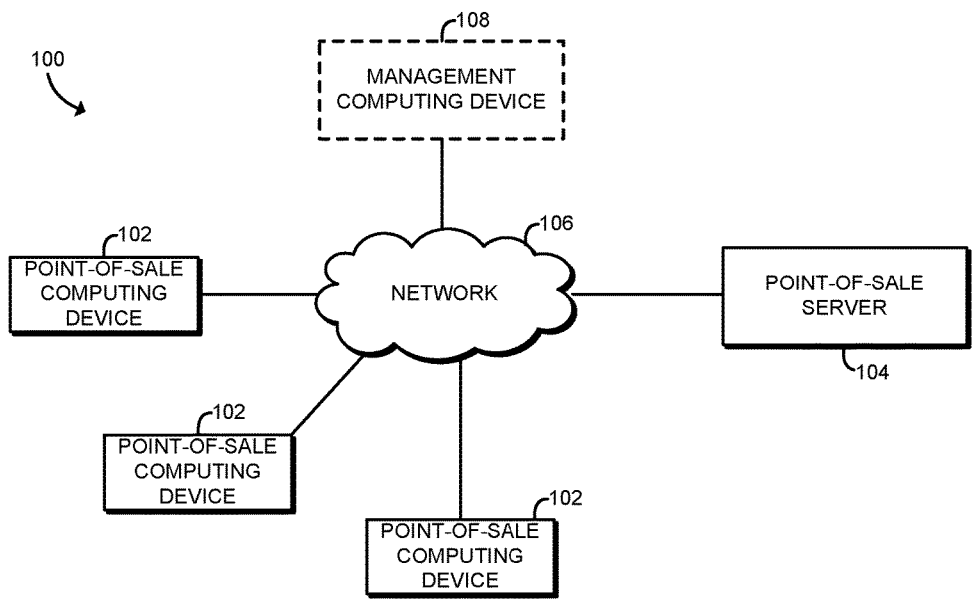
FIG. 1 is a simplified block diagram of at least one embodiment of a cloud-based point-of-sale system for commercial transactions.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 2:
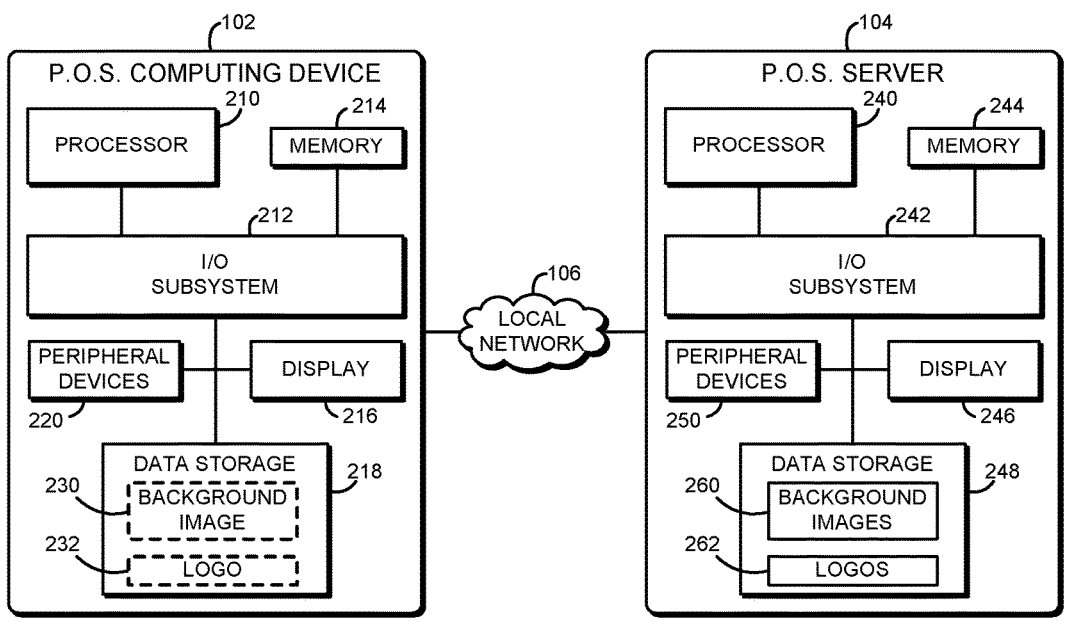
FIG. 2 is a simplified block diagram of at least one embodiment of a point-of-sale computing device and a point-of-sale server of the point-of-sale system of FIG. 1.

Referring now to FIGS. 1 and 2, an illustrative cloud-based point-of-sale system 100 comprises one or more mobile point-of-sale computing devices 102 and a point-of-sale server 104, which communicate with each other over a network 106. In use, a retailer (e.g., a sales associate of a retailer) may utilize any one of the mobile point-of-sale computing devices 102 to interact with customers while conducting a sales transaction. For example, the mobile point-of-sale computing device 102 may be used by the customer and/or retailer to display images of various inventory items, browse inventory items, search for inventory items, and complete the sales transaction (e.g., via cash, credit, or other form of payment). Interaction with the cloud-based point-of-sale system 100 is facilitated on each mobile point-of-sale computing device 102 via a point-of-sale graphical user interface. However, unlike traditional point-of-sale computing devices in which the point-of-sale graphical user interface typically includes a fixed nondescript background or a background commercialized with the logo of the company producing the associated point-of-sale system, the point-of-sale graphical user interface of the mobile point-of-sale computing devices 102 include backgrounds that are branded, or otherwise selected, by the specific retailer. In this way, the presentation of the point-of-sale graphical user interface to a potential customer maintains the branding desired by the retailer, which may reinforce the particular shopping experience offered by the retailer. Additionally, because the branded background images are stored on the point-of-sale server 104, the branded background image may be updated or changed without the need to individually update each mobile point-of-sale computing device 102.

As discussed above, the mobile point-of-sale computing devices 102 may be utilized by the retailer and/or customer to browse or search for inventory items offered for sale by the retailer. Because the inventory of the retailer is maintained by the point-of-sale server 104, each mobile point-of-sale computing device 102 may access the current inventory available for sale. Additionally, each inventory item may include one or more data tags associated therewith. That data tags may be used by the point-of-sale server 104 (or the mobile point-of-sale computing device 102) to search for inventory items associated with or related to a selected inventory item. For example, the data tags may include relational data tags that identify other inventory items previously determined to be related to the selected inventory item (e.g., a tie that has been determined to go well with a selected dress shirt). Additionally, the data tags may include description data tags that identify characteristics of the selected inventory item (e.g., the selected dress shirt includes stripes, is colored blue, has French cuffs, etc.), which may be used to search for other inventory items having the same or similar characteristics. In this way, the cloud-based point-of-sale system 100 provides a branded point-of-sale interface to a potential customer that is capable of intelligently identifying inventory items that may be of interest to the customer based on a selected item, previously purchased items, previously browsed items, and/or other criteria.

Each point-of-sale computing device 102 may be embodied as any type of mobile point-of-sale computing device capable of displaying a graphical user interface to a user and performing the functions described herein. For example, each point-of-sale computing device 102 may be embodied as a tablet computer, a netbook computer, a smartphone, a laptop computer, a digital assistant, a portable electronic media device, or other mobile computer or computing device. As shown in FIG. 2, each illustrative point-of-sale computing device 102 includes a processor 210, an I/O subsystem 212, memory 214, a display 216, a data storage 218, and one or more peripheral devices 220. Of course, the computing device 102 may include other or additional components, such as those commonly found in a computer (e.g., various input/output devices), in other embodiments. Additionally, in some embodiments, one or more of the illustrative components may be incorporated in, or otherwise from a portion of, another component. For example, the memory 214, or portions thereof, may be incorporated in the processor 210 in some embodiments.

The processor 210 may be embodied as any type of processor capable of performing the functions described herein. For example, the processor 210 may be embodied as a single or multi-core processor(s), digital signal processor, microcontroller, or other processor or processing/controlling circuit. Similarly, the memory 214 may be embodied as any type of volatile or non-volatile memory or data storage capable of performing the functions described herein. In operation, the memory 214 may store various data and software used during operation of the point-of-sale computing device 102 such as operating systems, applications, programs, libraries, and drivers. The memory 214 is communicatively coupled to the processor 210 via the I/O subsystem 212, which may be embodied as circuitry and/or components to facilitate input/output operations with the processor 210, the memory 214, and other components of the point-of-sale computing device 102. For example, the I/O subsystem 212 may be embodied as, or otherwise include, memory controller hubs, input/output control hubs, firmware devices, communication links and/or other components and subsystems to facilitate the input/output operations. In some embodiments, the I/O subsystem 212 may form a portion of a system-on-a-chip (SoC) and be incorporated, along with the processor 210, the memory 214, and other components of the point-of-sale computing device 102, on a single integrated circuit chip.

The display 216 of the point-of-sale computing device 102 may be embodied as any type of display capable of displaying digital information such as a liquid crystal display (LCD), a light emitting diode (LED), a plasma display, a cathode ray tube (CRT), or other type of display device. In some embodiments, the display 216 may be embodied as a touchscreen display to facilitate user interaction. In such embodiments, the display 216 may use any suitable technology to receive tactile input from a user via the touchscreen display. Although the illustrative point-of-sale computing device 102 includes the display 216 (e.g., incorporated therein), it should be appreciated that the point-of-sale computing device 102 may be communicatively coupled to a separate display device in some embodiments.

The data storage 218 may be embodied as any type of device or devices configured for short-term or long-term storage of data such as, for example, memory devices and circuits, memory cards, hard disk drives, solid-state drives, or other data storage devices. In some embodiments, the data storage 218 may store local copies of a background image 230 and/or a logo 232, which have been previously retrieved from the point-of-sale server 104. As discussed in more detail below, the background image 230 and logo 232 are displayed on the display 216 of the point-of-sale computing device 102 as part of the point-of-sale graphical user interface.

The peripheral devices 220 may include any type of peripheral device commonly found in a typical computing device, such as various input/output devices. For example, the peripheral devices 220 may include communication circuitry, display circuitry, various input buttons and switches, a keyboard, a mouse, speaker, microphone, and/or other peripheral devices.

The point-of-sale server 104 may be embodied as any type of server computer capable of performing the functions described herein. Although shown as a single computing device in FIGS. 1 and 2, it should be appreciated that the point-of-sale server 104 may be embodied as a "virtual" server and may be embodied as a plurality of different servers or computing devices operating together. As shown in FIG. 2, the illustrative point-of-sale server 104 includes a processor 240, an I/O subsystem 242, a memory 244, a display 246, a data storage 248, and one or more peripheral devise 250.

Similar to the processor 210 of the point-of-sale computing device 102, the processor 240 of the point-of-sale server 104 may be embodied as any type of processor capable of performing the functions described herein. For example, the processor 240 may be embodied as a single or multi-core processor(s), digital signal processor, microcontroller, or other processor or processing/controlling circuit. Similarly, the memory 244 may be embodied as any type of volatile or non-volatile memory or data storage capable of performing the functions described herein. In operation, the memory 244 may store various data and software used during operation of the point-of-sale server 104 such as operating systems, applications, programs, libraries, and drivers. The memory 24 is communicatively coupled to the processor 240 via the I/O subsystem 242, which may be embodied as circuitry and/or components to facilitate input/output operations with the processor 240, the memory 244, and other components of the point-of-sale server 104. For example, the I/O subsystem 242 may be embodied as, or otherwise include, memory controller hubs, input/output control hubs, firmware devices, communication links and/or other components and subsystems to facilitate the input/output operations.

The display 246 of the point-of-sale server 104 may be embodied as any type of display capable of displaying digital information such as a liquid crystal display (LCD), a light emitting diode (LED), a plasma display, a cathode ray tube (CRT), or other type of display device. The data storage 248 may be embodied as any type of device or devices configured for short-term or long-term storage of data such as, for example, memory devices and circuits, memory cards, hard disk drives, solid-state drives, or other data storage devices. In the illustrative embodiment, the data storage 248 stores a library of background images 260 and logos 262 associated with each particular retailer. The stored background images 260 and logos 262 may be provided by each retailer (e.g., uploaded to the point-of-sale server 104) or otherwise selected or approved by the retailer.

The peripheral devices 250 may include any type of peripheral device commonly found in a typical computing device, such as various input/output devices. For example, the peripheral devices 250 may include communication circuitry, display circuitry, various input buttons and switches, a keyboard, a mouse, speaker, microphone, and/or other peripheral devices.

As discussed, each of the point-of-sale computing devices 102 communicate with the point-of-sale server 104 over the network 106. The network 106 may be embodied as any number of various wired and/or wireless networks. For example, the network 106 may be embodied as, or otherwise include, a wired or wireless local area network (LAN), a wired or wireless wide area network (WAN), and/or a publicly-accessible, global network such as the Internet. As such, the network 106 may include any number of additional devices, such as additional computers, routers, and switches to facilitate communications among the devices of the system 100.

In some embodiments, the cloud-based point-of-sale system 100 may also include a management computing device 108. The management computing device 108 may be embodied as, for example, a "back office" computing device used by the retailer to manage various aspects of the cloud-based point-of-sale system 100. For example, the management computing device 108 may be used to select or set the desired branded background image and logo to be used by as part of the point-of-sale graphical user interface for each point-of-sale computing device 102. Additionally, the management computing device 108 may be used to update, or otherwise, manage the inventory stored by the point-of-sale server 104.

The management computing device 108 may be embodied as any type of computing device capable of performing the above-described functions. For example, the management computing device 108 may be embodied as a desktop computer, a laptop computer, a tablet computer, a netbook, a smartphone, or other computer or computing device. The management computing device 108 may include components similar to the components of the point-of-sale computing device 102, such as a processor, memory, I/O system, and data storage. As such, the description of the components of the point-of-sale computing device 102 is equally applicable to the corresponding components of the management computing device 108 and is not repeated herein for clarity of the description.

Figure 3:
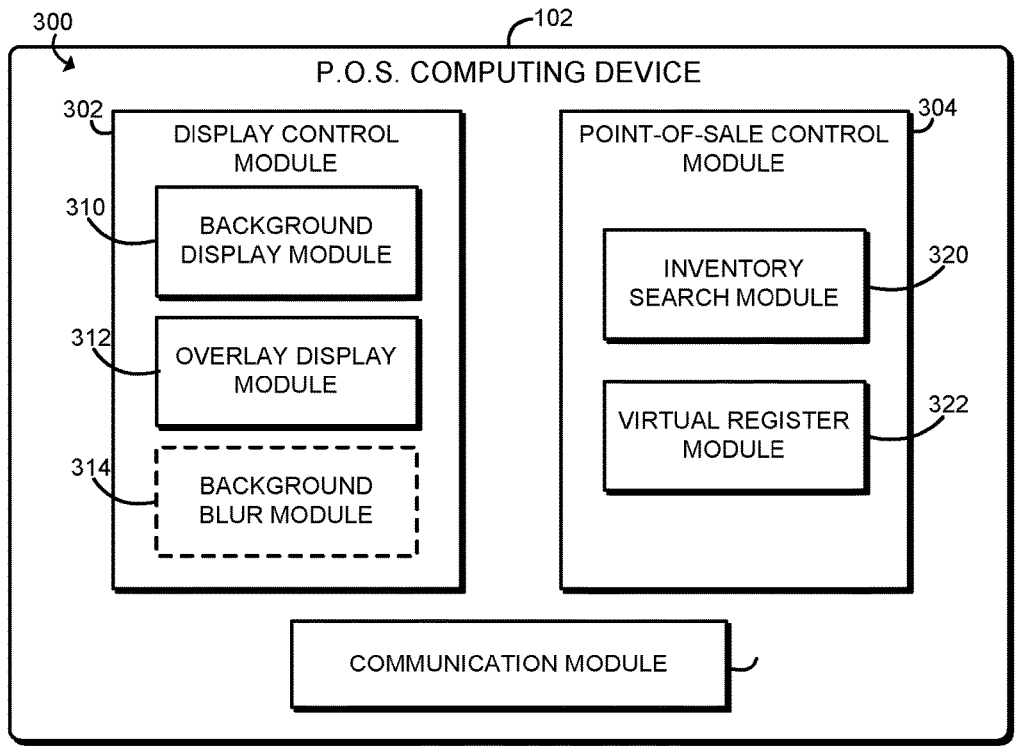
FIG. 3 is a simplified block diagram of at least one embodiment of an environment that may be established on the point-of-sale computing device of FIG. 2.

Referring now to FIG. 3, each point-of-sale computing device 102 may establish an environment 300 during operation. The illustrative environment 300 includes a display control module 302, a point-of-sale control module 304, and a communication module 306. The display control module 302 illustrative includes a background display module 310, an overlay display module 312, and a background blur module 314 in some embodiments. The point-of-sale control module 304 illustratively includes an inventory search module 320 and a virtual register module 322. Each of the various modules of the environment 300 may be embodied as firmware, software, hardware, or a combination thereof.

In use, the display control module 302 controls the display and user interaction of a point-of-sale graphical user interface on the display 216 of the point-of-sale computing device 102. As discussed above, the point-of-sale graphical user interface of each point-of-sale computing device 102 includes a branded background image and logo over which a point-of-sale user interface is overlaid. Accordingly, the display control module 302 includes a background display module 310 configured to display a branded background image and/or logo on the display 216 of the point-of-sale computing device 102. As discussed above, the background image and/or logo may be locally stored on the point-of-sale computing device 102 in the data storage 218 as a background image 230 and/or logo 232 or may be retrieved from the point-of-sale server 104 as needed.

The overlay display module 312 is configured to display a point-of-sale user interface over the branded background image on the display 216. The point-of-sale user interface enables a user of point-of-sale computing device 102 to conduct sales transactions and may include interfaces supporting various associated functions such as inventory searching and display, electronic register functions, and the like. The composition of the point-of-sale user interface may depend on the particular implementation and may be customized for each retailer. In the illustrative embodiment, the point-of-sale user interface includes multiple display windows for displaying various information (e.g., images of inventory items, current total of the purchase, etc.) to a user of the point-of-sale computing device 102. At least some of the display windows are semitransparent such that a portion of the branded background image is visible through the semitransparent display window, even though additional information may be displayed within the particular semitransparent display window. Similar to the background image and logo, the point-of-sale user interface may be stored locally in the data storage 218 or retrieved from the point-of-sale server 104 as needed.

In some embodiments, the display control module 302 may also include a background blur module 314. The background blur module 314 is configured to blur the portion of the background visible through a particular semitransparent display window of the point-of-sale user interface to improve the visibility of information provided in the associated semitransparent display window. The background blur module 314 may blur the background of a display window based on any suitable criteria such as the particular information displayed in the display window (e.g., a display window including the logo image), in response to a user request or interaction, or other criteria. In some embodiments, as discussed below, the functionality of the background blur module 314 may be included in the point-of-sale server 104. In such embodiments, the branded background image may be received from the point-of-sale server 104 having portions corresponding to particular display windows of the point-of-sale user interface (which may also be retrieved from the point-of-sale server 104) already blurred.

The point-of-sale control module 304 controls the functionality of the point-of-sale user interface to facilitate sale transactions via the point-of-sale computing device 102. For example, the inventory search module 320 manages the searching, browsing, and display of inventory items for sale on the point-of-sale computing device 102. As discussed in more detail below, inventory items may be searched based on information data tags associated with each inventory item. The virtual register module 322 performs typical register functions, such as the acquisition of credit card information, to allow a retailer to complete a sales transaction using the mobile point-of-sale computing device 102.

The communication module 306 is configured to establish communications with the point-of-sale server 104 and transmit and receive various information therefrom during operation. For example, as discussed above, the background image, logo image, and point-of-sale user interface may be received from the point-of-sale server 104 via the communication module 306. Additionally, the communication module 306 may receive results of inventory searching or browsing functions initiated on the point-of-sale computing device 102, as well as information related to the completion of a sales transaction (e.g., an electronic receipt from the point-of-sale server 104.

Figure 4:
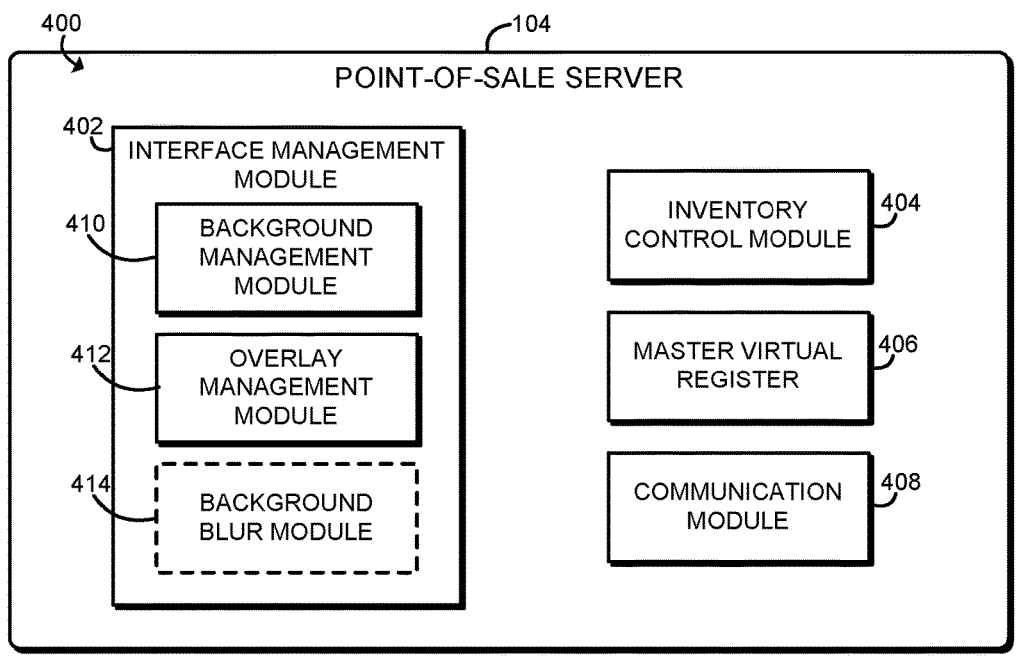
FIG. 4 is a simplified block diagram of at least one embodiment of an environment that may be established on the point-of-sale server of FIG. 2.

Referring now to FIG. 4, the point-of-sale server 104 may establish an environment 400 during operation. The illustrative environment 400 includes an interface management module 402, an inventory control module 404, a master virtual register 406, and a communication module 408. The interface management module includes a background management module 410, an overlay management module 412, and a background blur module 414 in some embodiments. Each of the various modules of the environment 400 may be embodied as firmware, software, hardware, or a combination thereof.

The interface management module 402 manages the updating, distribution, and interaction of the point-of-sale graphical user interface for each of the point-of-sale computing device 102. For example, the background management module 410 is configured to facilitate selection or establishment of the background and logo images and distribute the selected background and logo images to each of the point-of-sale computing device 102 as discussed in more detail below. Similarly, the overlay management module 412 is configured to facilitate the configuration of the point-of-sale user interface and distribute the point-of-sale user interface to the point-of-sale computing device 102. In some embodiments, the interface management module 402 may also include a background blur module 414. In such embodiments, the interface management module 402 blurs portions of the branded background image covered by particular display windows of the point-of-sale user interface prior to transmitting the branded background image and point-of-sale user interface to the computing device 102.

The inventory control module 404 is configured to control and manage the inventory items offered for sale by the retailer. For example, the inventory control module 404 may perform inventory searching based on the data tag information (e.g., relational data tags or description data tags) associated with each inventory item. Additionally, the inventory control module 404 updates the inventory based on sales transactions completed by any of the point-of-sale computing devices 102, such that each computing device 102 has an up-to-date representation of the current inventory. The inventory control module 404 also facilitates the addition of new inventory items and/or manual updating of existing inventory items.

The master virtual register 406 is configured to perform various register functions for completing sales transactions initiated on any of the point-of-sale computing device 102. For example, the master virtual register 406 may complete a sales transaction using credit card information received from a point-of-sale computing device 102. The master virtual register 406 may also communicate with the inventory control module 404 to update the current inventory based on recent sales transactions.

Similar to the communication module 306, the communication module 408 of the point-of-sale computing device 102 is configured to establish communications with each point-of-sale computing device 102 and transmit and receive various information therefrom during operation. For example, as discussed above, the communication module 408 may transmit the background image, logo image, and point-of-sale user interface to the point-of-sale computing devices 102. Additionally, the communication module 306 may receive sales transaction data, inventory search requests, and other communication from the point-of-sale computing devices 102 and transmit associated responses to such communication.

Figure 5:
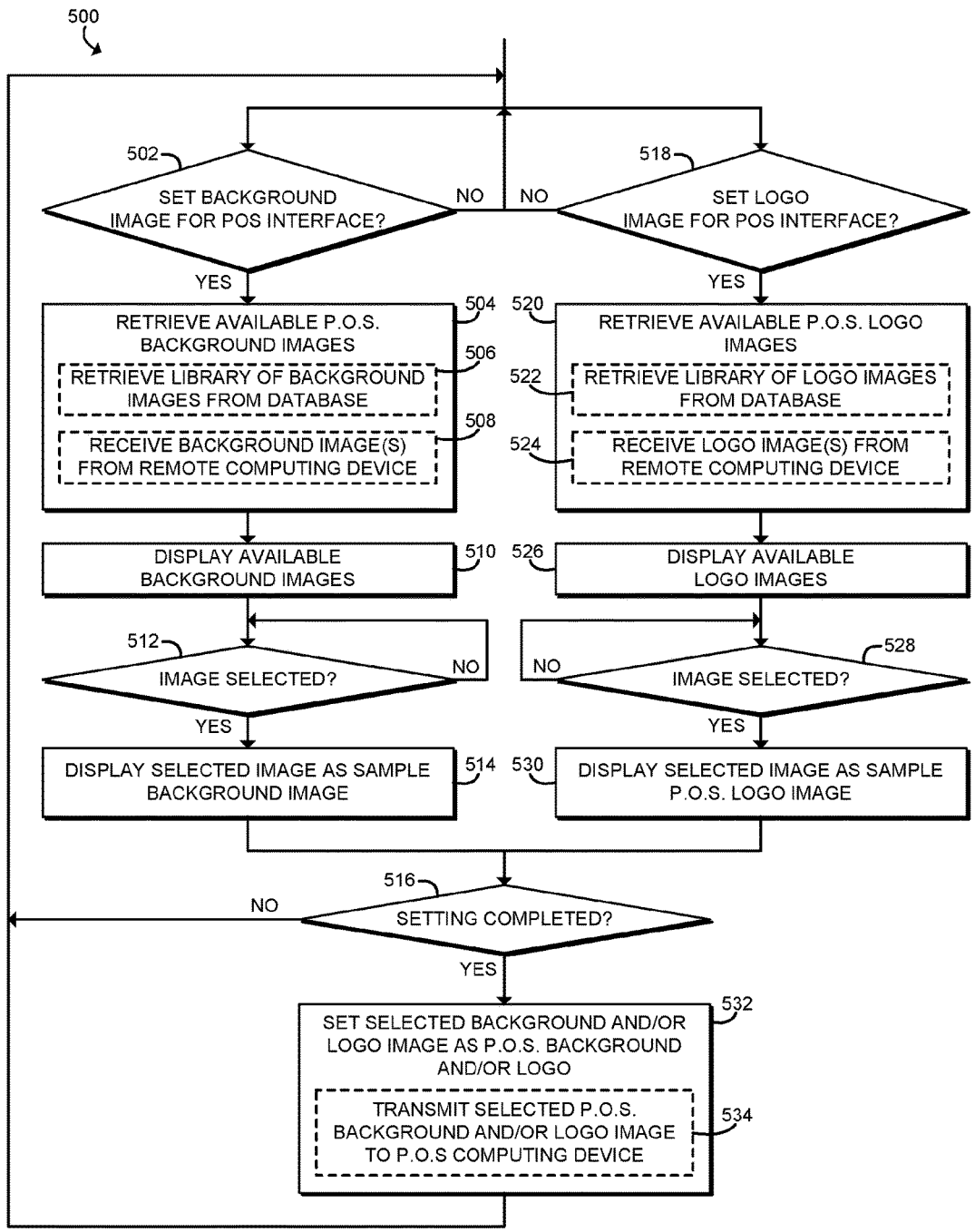
FIG. 5 is a simplified flow diagram of at least one embodiment of a method for setting a branded background image and/or a logo image of a point-of-sale user interface.
Figure 9:
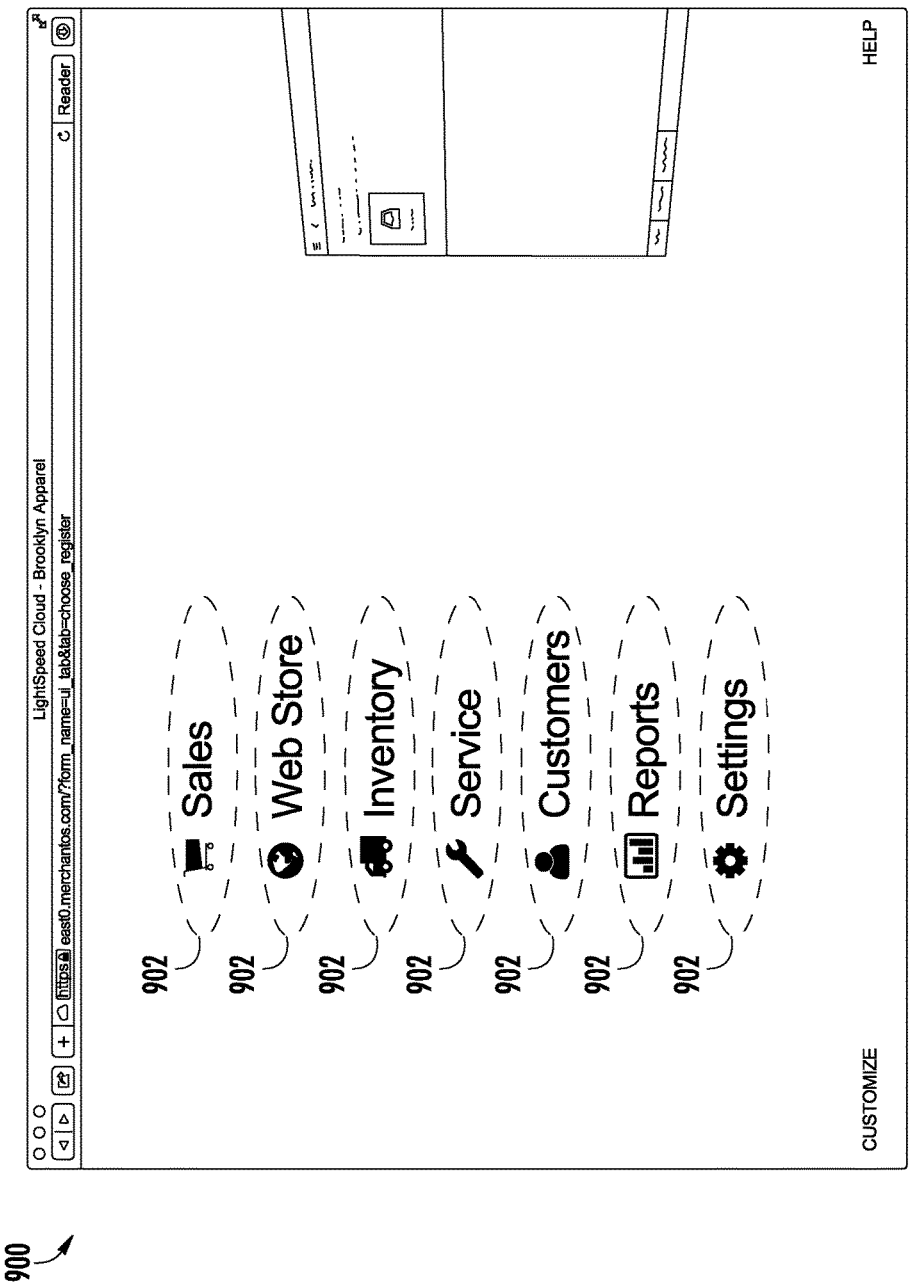
FIGS. 9-27 are illustrative screenshots that may be displayed on the point-of-sale computing device of FIG. 2 during execution of one or more of the methods of FIGS. 5-8.

Referring now to FIG. 5, in use, a method 500 for setting a background image and/or a logo image of a point-of-sale user interface may be executed by the point-of-sale server 104. The method 500 begins with blocks 502 and 518. In block 502, the point-of-sale server 104 determines whether a user desires to set a background image for the point-of-sale graphical user interface to be displayed by each point-of-sale computing device 102. To do so, the point-of-sale server 104 may present a management interface 900 to the user as shown in FIG. 9. The illustrative management interface 900 includes a number of option buttons or widgets 902, each of which may be selected by the user to perform various management operations. In the illustrative embodiment, the management interface 900 includes a sales widget, a web store widget, an inventory widget, a service widget, a customers widget, a reports widget, and a settings widget. Of course, the management interface 900 may include other widgets and functionality in other embodiments.

The user may elect to set the background image by selecting the settings widget or other corresponding widget of the management interface 900. In response, the point-of-sale server 104 may display an image selection interface 1000 to the user. The image selection interface 1000 includes a background selection window 1002 and a logo selection window 1004. In the illustrative embodiment, the user may elect to set the background image of the point-of-sale graphical user interface by selecting the background selection window 1002.

Figure 11:
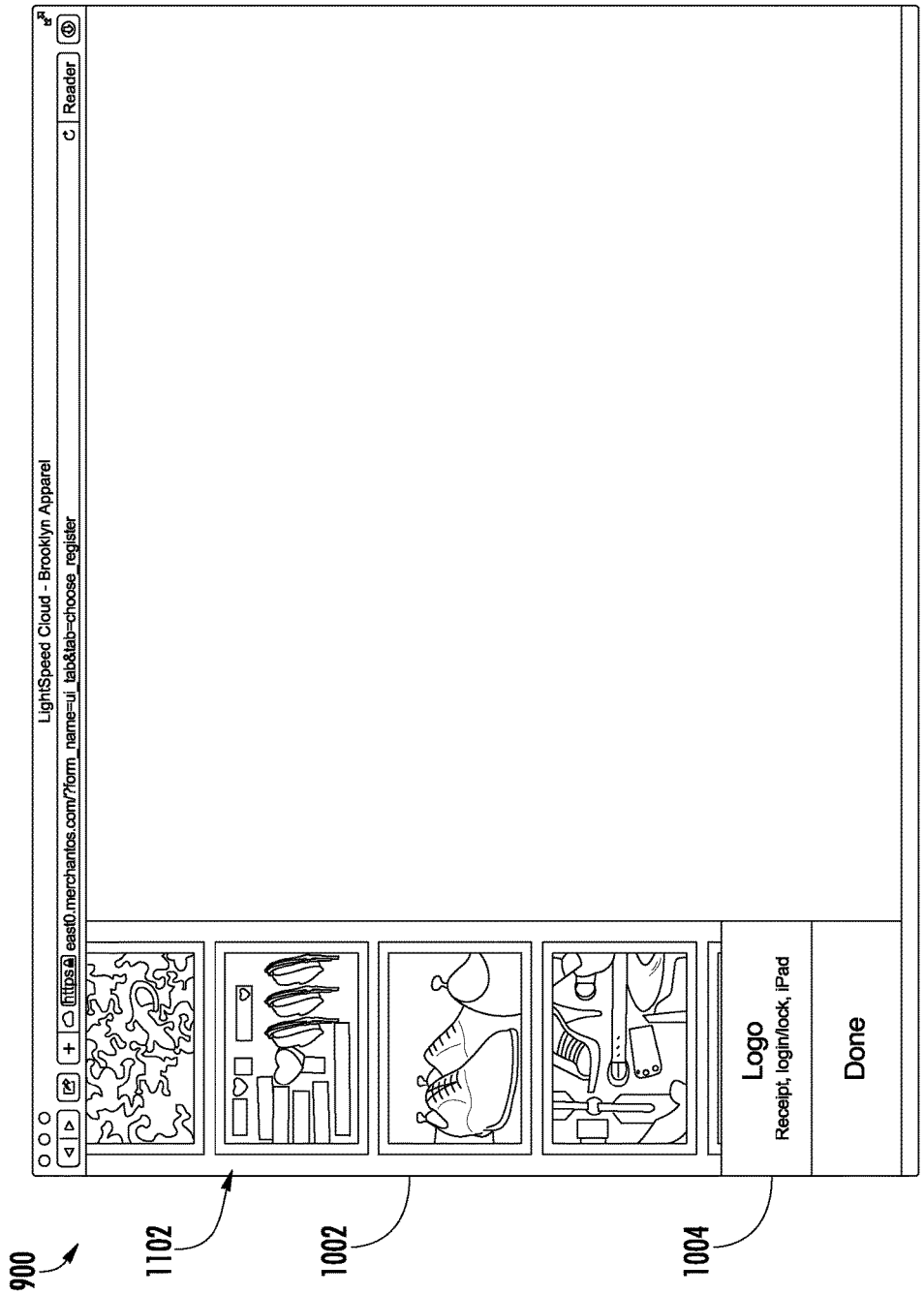

Referring back to FIG. 5, if the user has elected to set the background image for the point-of-sale graphical user interface, the method 500 advances to block 504 in which available point-of-sale background images are retrieved. As discussed above, the background images are illustratively embodied as branded background images associated with the business entity conducting the sales transactions using the point-of-sale computing devices 102. For example, the background image may include the name of the business entity (e.g., retailer) and/or be embodied as a picture of the brick-and-mortar store, the interior of the store, products offered by the business entity, employees of the business entity, or other image that associated with the particular business entity. In some embodiments, the point-of-sale server 104 may retrieve a library of possible background images from the local data storage 248 in block 506. Such images may have been previously supplied to the point-of-sale server 104 by the business entity or may be a collection of background images determined to be relevant to the business entity (e.g., pre-established background images related to the particular products offered by the business entity). Alternatively, the background image may be received from a remote computing device, such as the management computing device 108 or a point-of-sale computing device 102, in block 508. Regardless, in block 510, the point-of-sale server 104 displays the available background images to a user of the remote computing device. For example, as shown in FIG. 11, a list of available background images 1102 may be displayed in the background selection window 1002.

Figure 12:
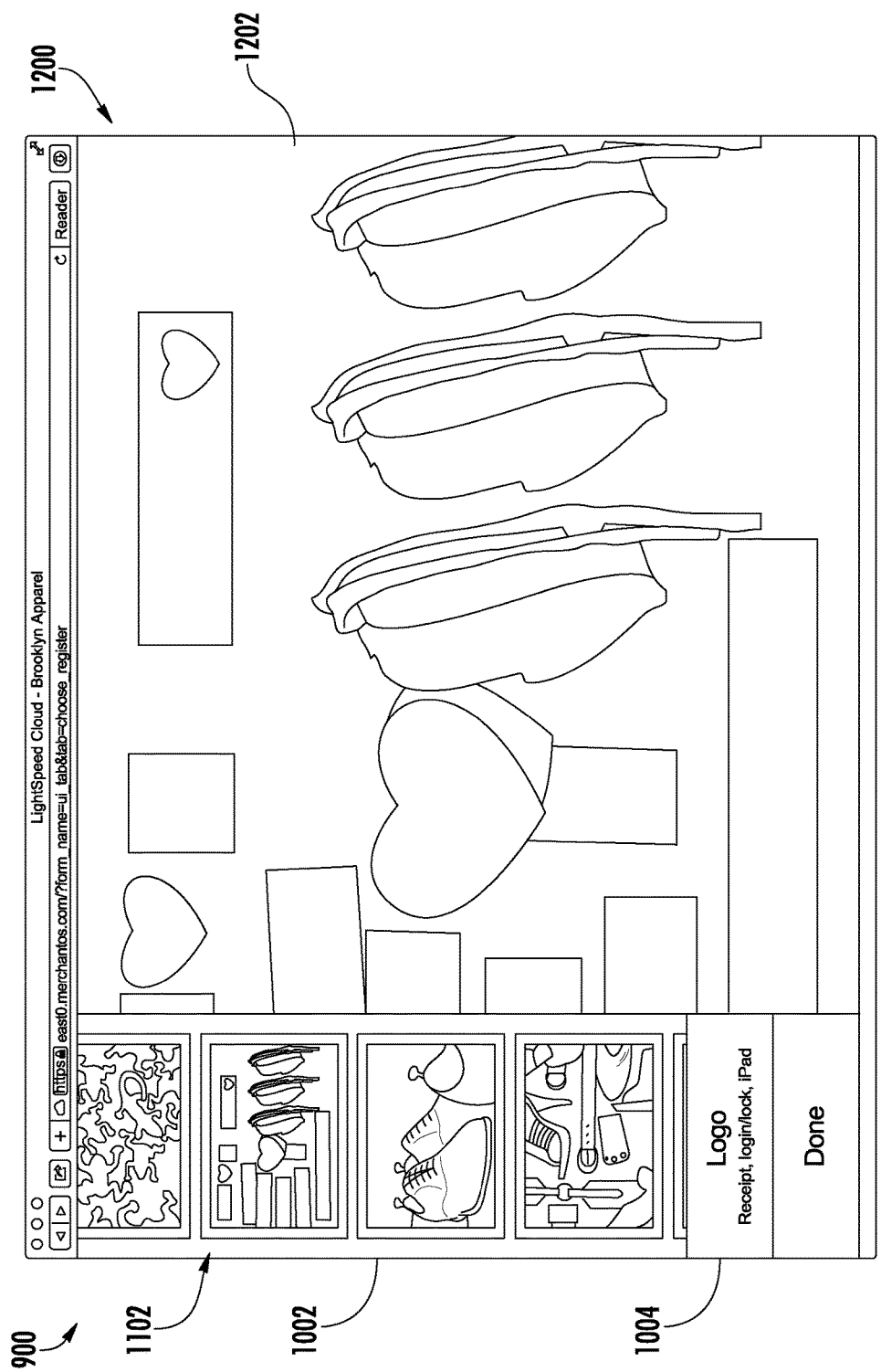

Referring back to FIG. 5, in block 512, the point-of-sale server 104 determines whether a user has selected an image to set as the branded background image. If so, the method 500 advances to block 514 in which the point-of-sale server 104 displays the selected image as a sample branded background image. For example, as shown in FIG. 12, the selected branded background image 1202 is displayed in a sample display window 1200 of the management interface 900.

Referring back again to FIG. 5, after the selected image has been displayed in the sample display window 1200, the method 500 advances to block 516 in which the point-of-sale server 104 determines whether current configuration is complete (e.g., whether the user desires to set the selected background image and/or logo as the background image and/or logo for the point-of-sale graphical user interface). If not, the method 500 loops back to block 502 and 518 in which the point-of-sale server 104 determines whether the user desires to set the background image or logo image, respectively. However, if the current configuration is complete, the method 500 advances to block 532 in which the selected branded background image is set as the background image for the point-of-sale graphical user interface. To do so, the point-of-sale server 104 may store the selected branded background image in pre-defined storage location or otherwise store information indicative of the selected branded background image. In some embodiments, the point-of-sale server may also transmit the selected branded background image to each point-of-sale computing device 102 in block 534.

Figure 10:
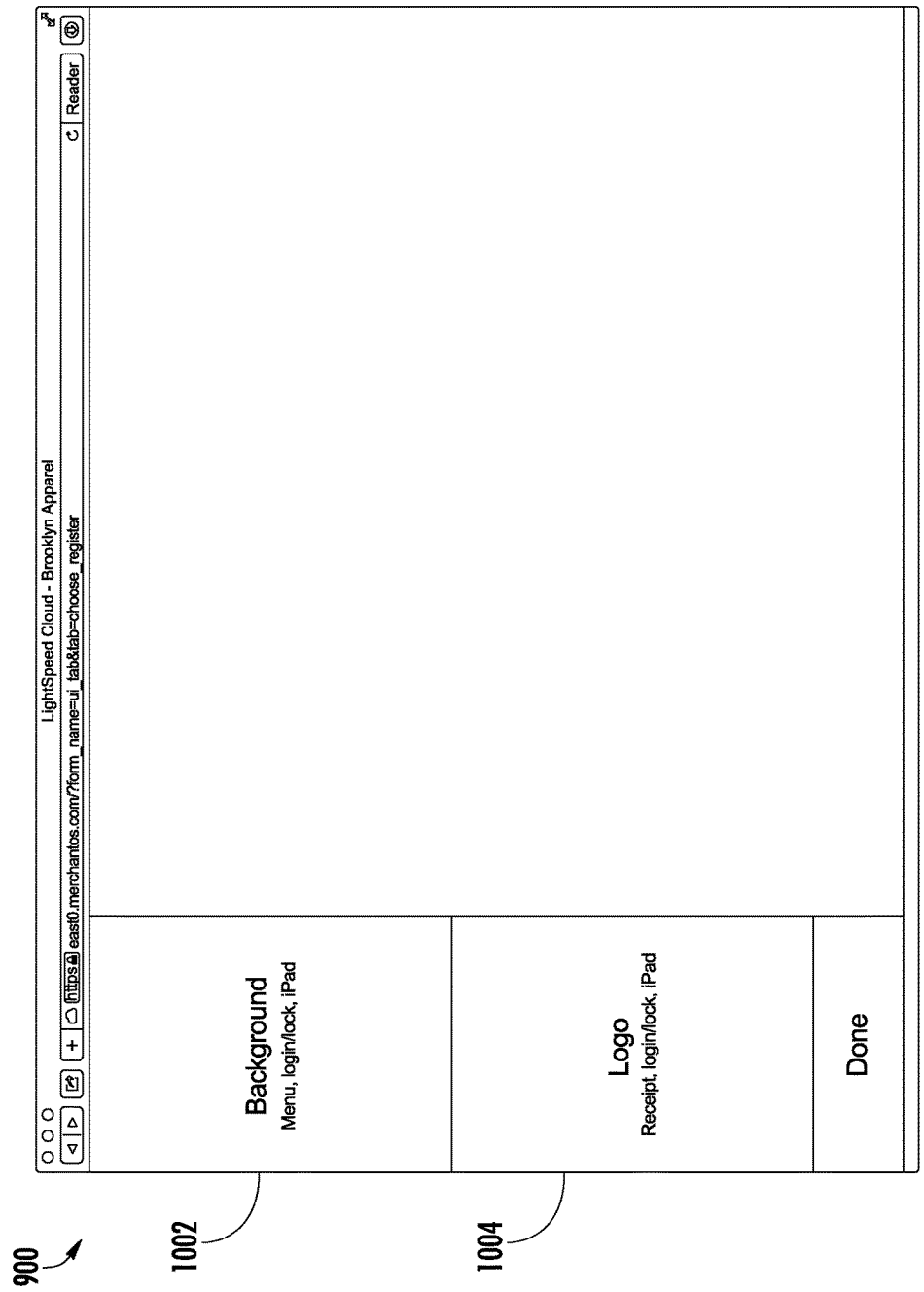
Figure 13:
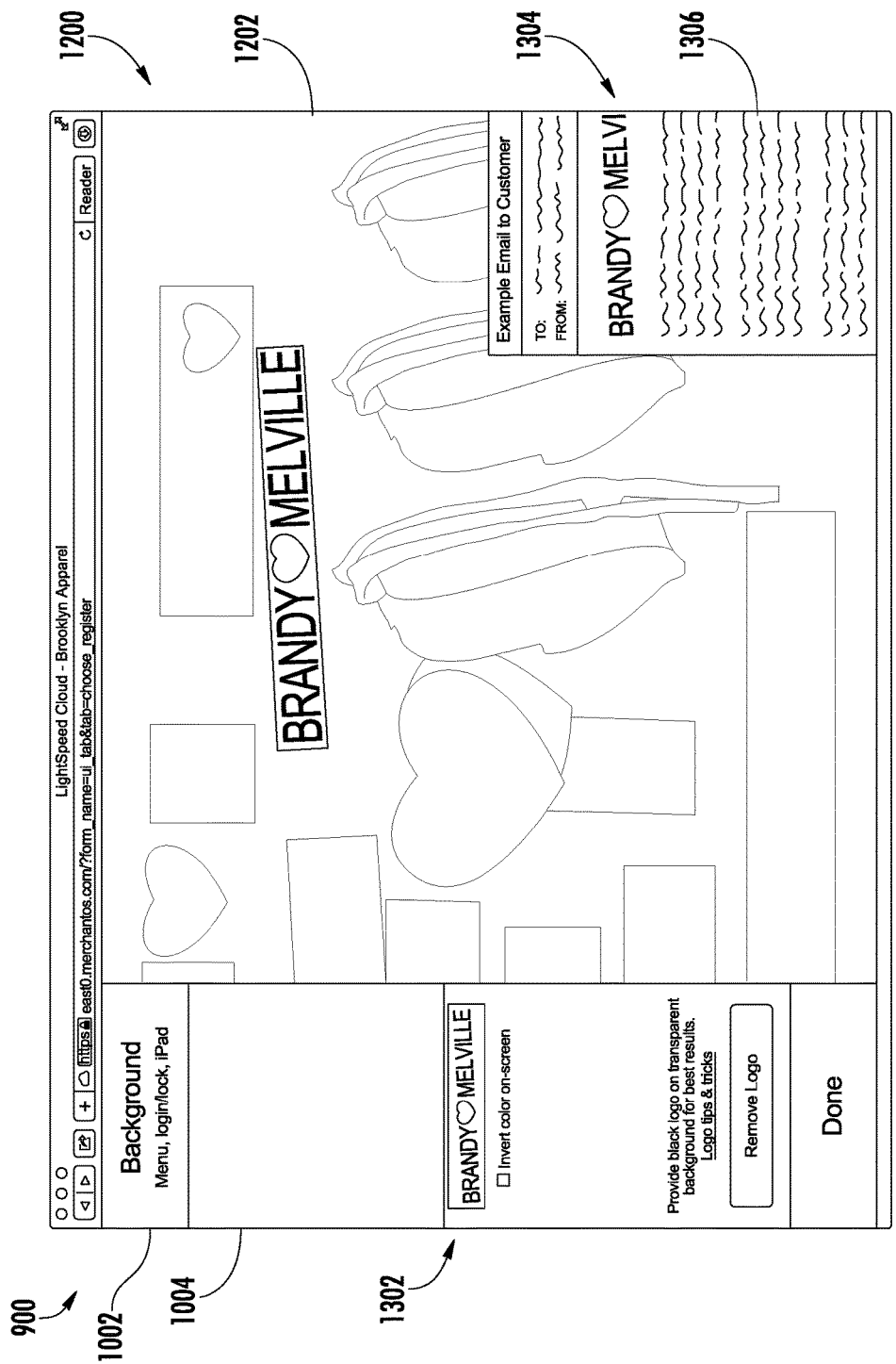

Referring back to block 518, the point-of-sale server 104 determines whether a user desires to set a logo image for the point-of-sale graphical user interface to be displayed by each point-of-sale computing device 102. To do so, the user may select the logo selection window 1004 of the management interface 900 as shown in FIG. 10. If the user has elected to set the logo image for the point-of-sale graphical user interface, the method 500 advances to block 520 in which available point-of-sale logo images are retrieved. The logo images may be embodied as any type of image or indicia of a logo of the business entity conducting the sales transactions using the computing device 102. In some embodiments, the point-of-sale server 104 may retrieve a library of possible logo images from the local data storage 248 in block 522. Such images may have been previously supplied to the point-of-sale server 104 by the business entity. Alternatively, the logo image may be received from a remote computing device, such as the management computing device 108 or a point-of-sale computing device 102, in block 524. Regardless, in block 526, the point-of-sale server 104 displays the available logo images to a user of the remote computing device. For example, as shown in FIG. 13, a list of available logo images 1302 may be displayed in the background selection window 1002.

Referring back to FIG. 5, in block 528, the point-of-sale server 104 determines whether a user has selected an image to set as the logo image. If so, the method 500 advances to block 530 in which the point-of-sale server 104 displays the selected image as a sample logo image. For example, as shown in FIG. 13, the selected logo image 1302 is displayed in the sample display window 1200 of the management interface 900 over the background image 1202. Additionally, an illustrative e-mail header 1304 using the selected logo image 1302 is shown in an e-mail sample window 1306.

Referring back again to FIG. 5, after the selected image has been displayed in the sample display window 1200, the method 500 advances to block 516 in which the point-of-sale serve 104 determines whether current configuration is complete. If so, the method 500 advances to block 532 in which the selected logo image is set as the logo image for the point-of-sale graphical user interface. To do so, the point-of-sale server 104 may store the selected logo background image in pre-defined storage location or otherwise store information indicative of the selected logo image. In some embodiments, the point-of-sale server may also transmit the selected logo image to each point-of-sale computing device 102 in block 534.

It should be appreciated that the method 500 allows a retailer or other business entity to brand the point-of-sale graphical user interface presented on each point-of-sale computing device 102 without the requirement of individually configuring each of the computing devices 102. Such branding may reinforce the brand of the retailer and provide a consistent shopping experience to customers using, or otherwise viewing, the point-of-sale computing devices 102.

Figure 6:
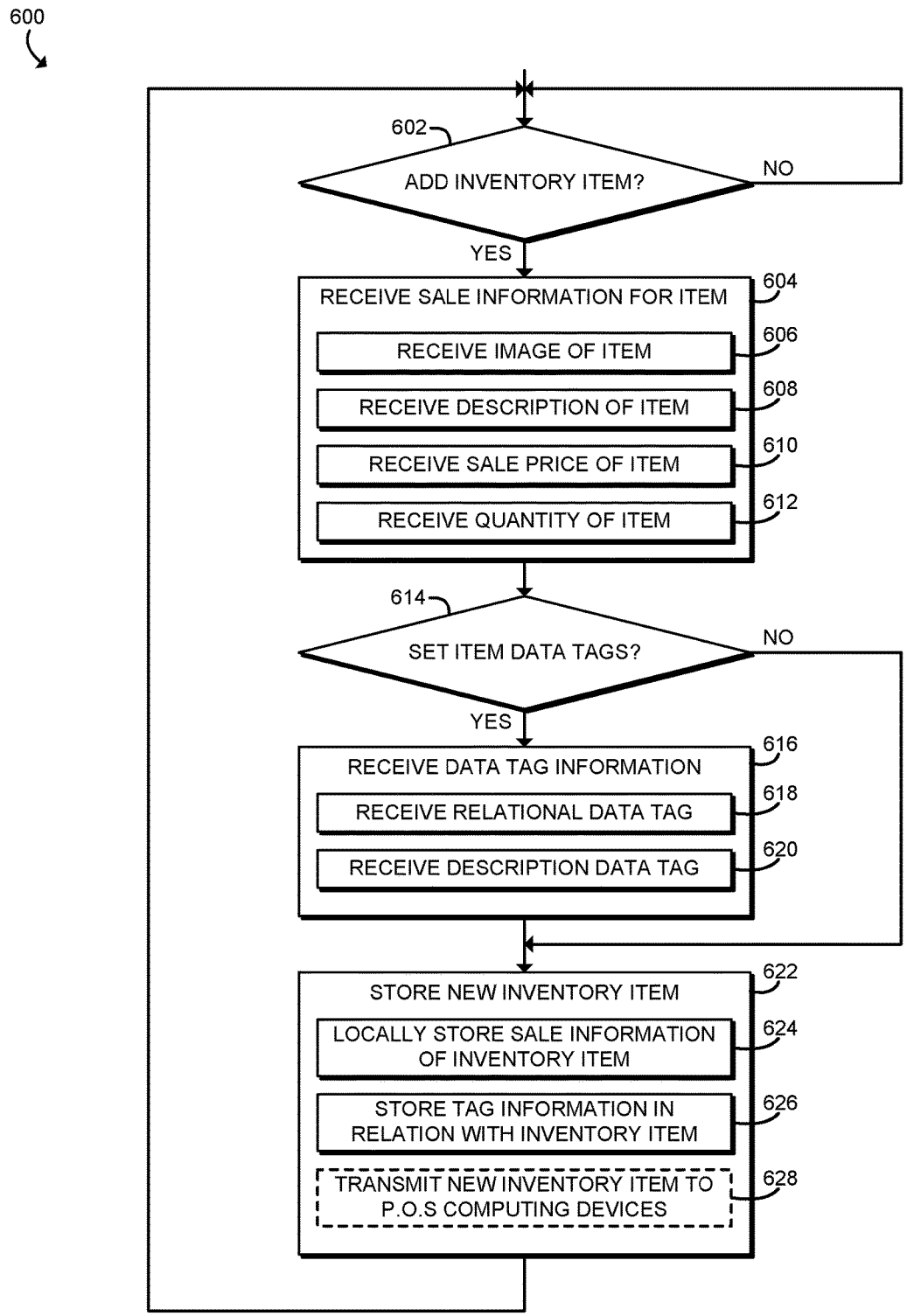
FIG. 6 is a simplified flow diagram of at least one embodiment of a method for updating inventory items that may be executed by the point-of-sale server of FIG. 2.

Referring now to FIG. 6, in use, the point-of-sale server 104 may also execute a method 600 for updating inventory items of a retailer stored on the point-of-sale server 104. To do so, a user (e.g., a manager of the retailer) may operate the management computing device 108 or one of the point-of-sale computing devices 102 to communicate with the point-of-sale server 104 over the network 106 to update the inventory items. The method 600 begins with block 602 in which the point-of-sale server 104 determines whether a user desires to add a new inventory item. If so, the method 600 advances to block 604 in which the point-of-sale server 104 receives sale information for the inventory item to be added. To do so, the point-of-sale server 104 may present an update interface to the user having various data fields that may be filled to supply the sale information to the point-of-sale server. The sale information may include any useful information relating to the inventory item to be added. For example, in block 606, the point-of-sale server 104 may receive an image of the new inventory item. Additionally, in block 608, the point-of-sale server 104 may receive a description of the new inventory item. In blocks 610 and 612, the point-of-sale server 104 may receive a sale price and a quantity-on-hand number for the new inventory item, respectively. Of course, additional or other sale information for the new inventory item to be added may be received by the point-of-sale server 104 in other embodiments.

In block 614, the point-of-sale server 104 determines whether the user desires to add or set data tags for the new inventory item. If so, the method 600 advances to block 616 in which the point-of-sale server 104 receives data tag information for the new inventory item from the retailer. The data tag information may be embodied as any type of information useful in searching for other inventory items related to a new inventory item. For example, in block 618, the point-of-sale server 104 may receive relational data tag information, which defines or identifies other inventory items that have been determined to be related to the new inventory item. For example, if the new inventory item is a belt, the relational data tag information may identify shoes, pants, and/or shirts that the retailer has determined to go well with the new belt. Additionally or alternatively, the point-of-sale server 104 may receive description data tag information in block 620. The description tag information includes data identifying various characteristics of the new inventory item, which may be used to search for other inventory items having similar characteristics. For example, if the new item is a belt, the description tag information may include data that indicates the color of the belt, the material of the belt, the pattern of the belt, the size of the belt, and/or other characteristics of the belt.

Subsequently, in block 622, the point-of-sale server 104 stores the new inventory item. For example, in block 624, the point-of-sale server 104 stores the sale information of the new inventory item received in block 604. Additionally, in block 626, the point-of-sale server 104 stores the tag information received in block 616. The tag information is stored in relation to the inventory item such that the tag information may be used to identify other related inventory items during an inventory search or browse. In some embodiments, the point-of-sale server 104 may also transmit the newly added inventory item information to each of the mobile point-of-sale computing devices 102 in block 628.

Figure 7:
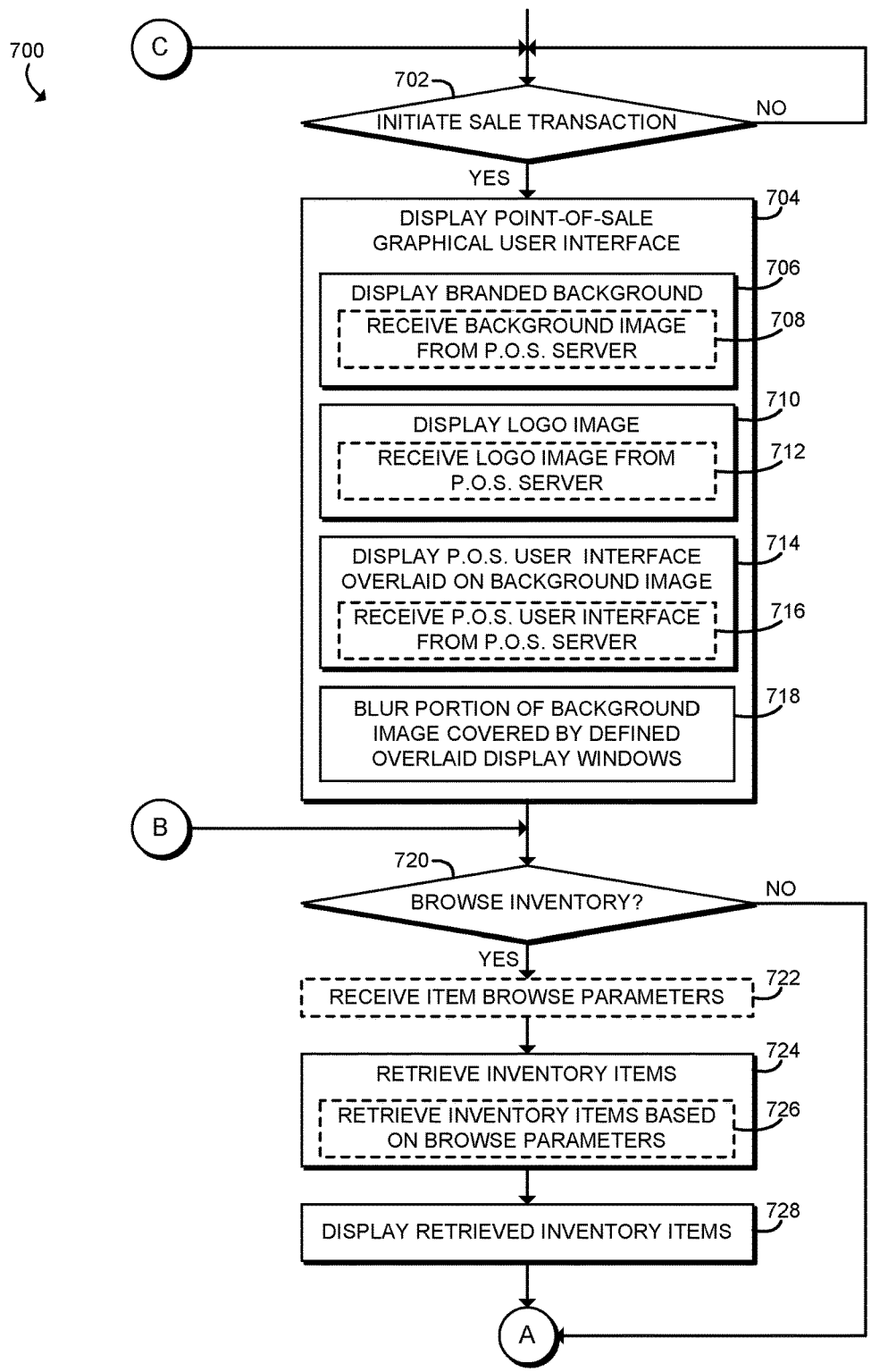
FIGS. 7 and 8 is a simplified flow diagram of at least one embodiment of a method for conducting a sales transaction that may be executed by the point-of-sale computing device of FIG. 2.
Figure 8:
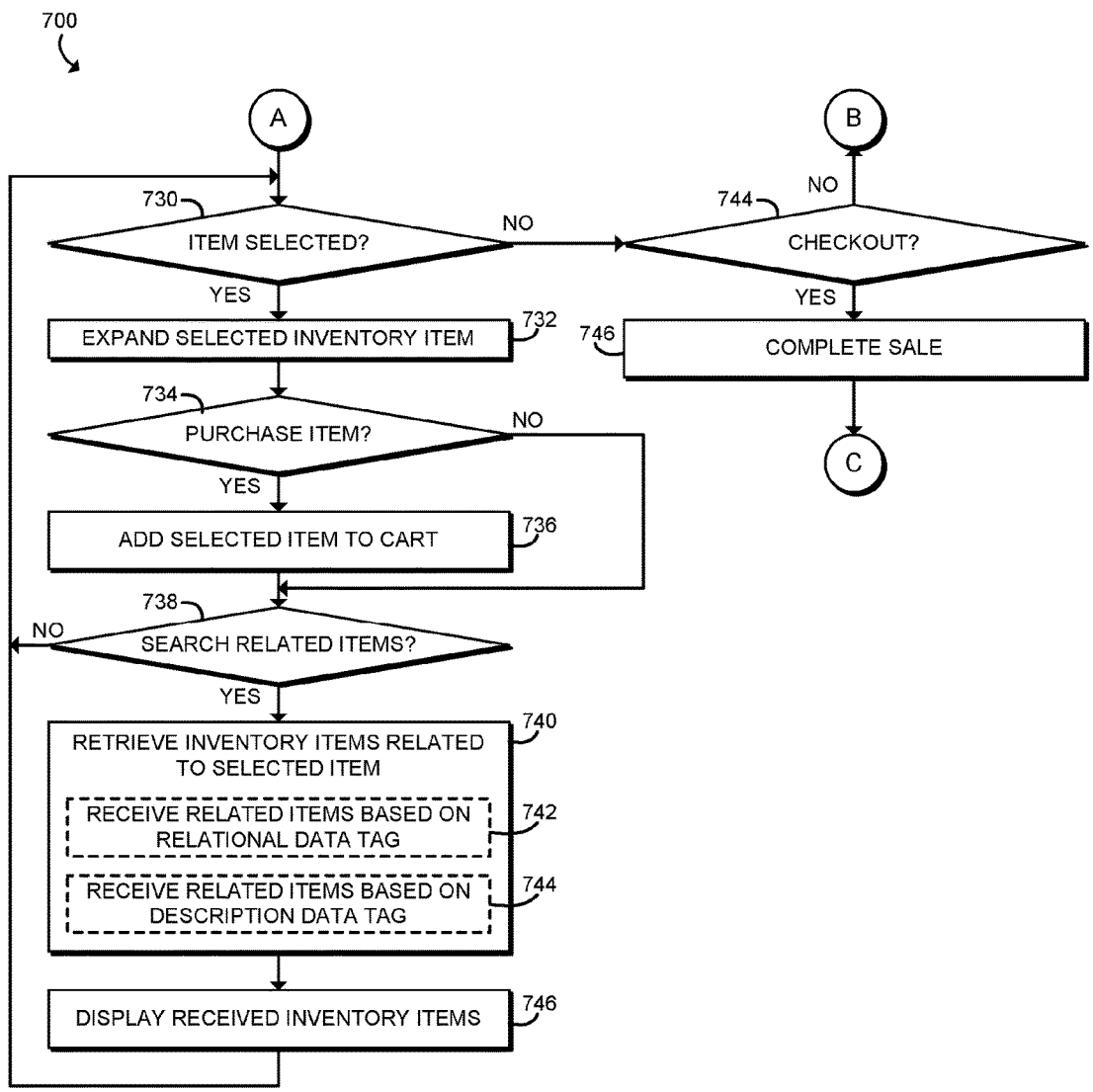

Referring now to FIGS. 7 and 8, in use, each point-of-sale computing device 102 may execute a method 700 for conducting a sales transaction. The method 700 begins with block 702 in which the point-of-sale computing device 102 determines whether the user desires to initiate a sale transaction. If so, the method 700 advances to block 704 in which the point-of-sale graphical user interface is displayed on the display 216. As discussed above, the point-of-sale graphical user interface may include a branded background image, a logo image, and a point-of-sale user interface overlaid on the background image. As such, in block 706, the point-of-sale computing device 102 displays the branded background image on the display 216. As discussed above, in some embodiments, the point-of-sale computing device 102 may receive the branded background image from the point-of-sale server 104 in block 708. Additionally, in block 710, the point-of-sale computing device 102 displays the logo image on the display 216. The logo image may be displayed on the branded background image or in a display window of the point-of-sale user interface. Similar to the branded background image, the logo image may be received from the point-of-sale server 104 in block 712 in some embodiments. The point-of-sale computing device 102 also displays the point-of-sale user interface overlaid on the branded background image. As discussed above, the point-of-sale user interface may include multiple semitransparent display windows in which various sales transaction information may be displayed. In some embodiments, the point-of-sale user interface may be received from the point-of-sale server 104 in block 716.

In block 718, the point-of-sale computing device 102 blurs portions of the background image that are visible through particular semitransparent display windows of the point-of-sale user interface to improve the visibility of information provided in the associated semitransparent display window. The particular display windows of the point-of-sale user interface that are to be blurred, and the timing of such blurring, may be dependent of various criteria such as the particular information displayed in the display window (e.g., a display window including the logo image), in response to a user request or interaction, or other criteria. As discussed above, in some embodiments, the point-of-sale computing device 102 may not perform the blurring functionality. In such embodiments, the point-of-sale server 104 may perform the blurring of the background image prior to transmitting the background image to the point-of-sale computing device 102.

Figure 14:
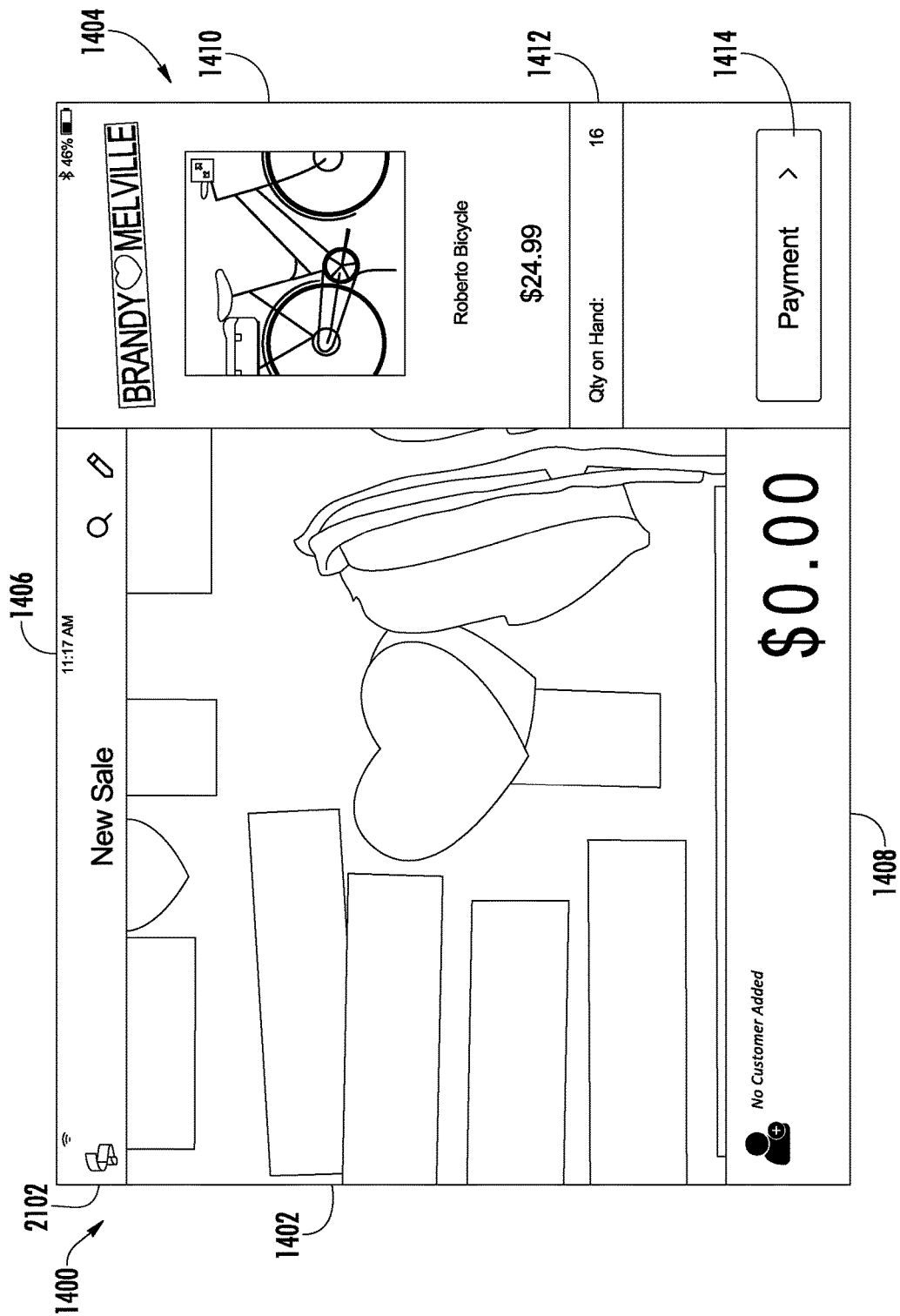

An illustrative point-of-sale graphical user interface 1400 is shown in FIG. 14. The point-of-sale graphical user interface 1400 includes a branded background image 1402 and a point-of-sale user interface 1404 overlaid on top of the branded background image 1402. The point-of-sale user interface 1404 includes a plurality of display windows. For example, the illustrative point-of-sale graphical user interface 1400 includes a banner display window 1406, a purchase total display window 1408, an inventory display window 1410, a quantity-on-hand display window 1412, and a payment window 1414. In should be appreciated that each of the purchase total display window 1408, the inventory display window 1410, the quantity-on-hand display window 1412, and the payment window 1414 are semitransparent windows. Additionally, as shown, the portion of the background image 1402 visible through the payment window 1414 has been blurred to increase the visibility and to accentuate the information contained in the payment window 1414. Of course, it should be appreciated that the point-of-sale graphical user interface 1400 may include additional or other display windows in other embodiments.

Referring back to FIG. 7, after the point-of-sale graphical user interface has been displayed on the display 216 of the computing device 102, the method 700 advances to block 720. In block 720 the point-of-sale computing device 102 determines whether the user would like to browse the inventory available for purchase. To do so, the user may select an appropriate button or selection widget of the point-of-sale graphical user interface. If so, in some embodiments, the method 700 advances to block 722 in which the point-of-sale computing device 102 receives browse parameters from the user (e.g., the customer or retailer associate). The browse parameters may be embodied as any type of data based on which the point-of-sale server 104 may search the inventory items to identify items matching the browse parameters. For example, the browse parameters may include the type of inventory items desired to be browsed (e.g., "dress shirts," "bicycles," "hand tools," etc.) or characteristics of the desired inventory items (e.g., color, cost, materials of manufacture, etc.). In block 724, the point-of-sale computing device 102 retrieves the inventory items from the point-of-sale server 104 for browsing. In some embodiments, the entirety of the available inventory items may be retrieved from the point-of-sale server 104. Alternatively, in block 726, the retrieved inventory items may be based on the browse parameters (i.e., the point-of-sale server 104 may search for and return inventory items identified based on the browse parameters). In block 728, the point-of-sale computing device 102 displays the retrieved inventory items to the user.

Figure 15:
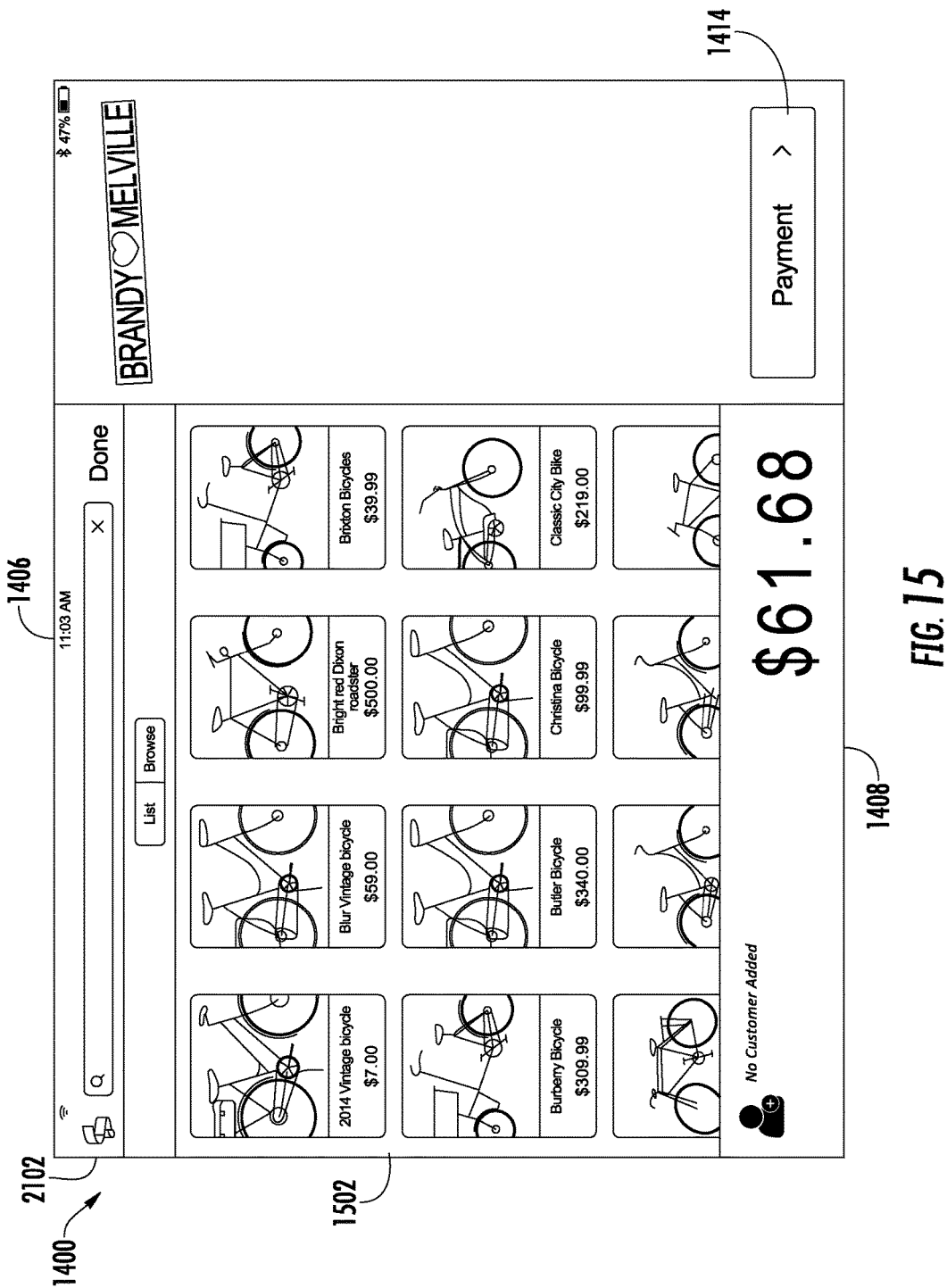

An illustrative browse results display 1500 is shown in FIG. 15. The browse results display 1502 include a number of inventory item display windows, each of which includes an image of the corresponding inventory, a short description, and the associated cost. A user of the point-of-sale computing device 102 may browse the available inventory items by scrolling through the various inventory item display windows.

Figure 16:
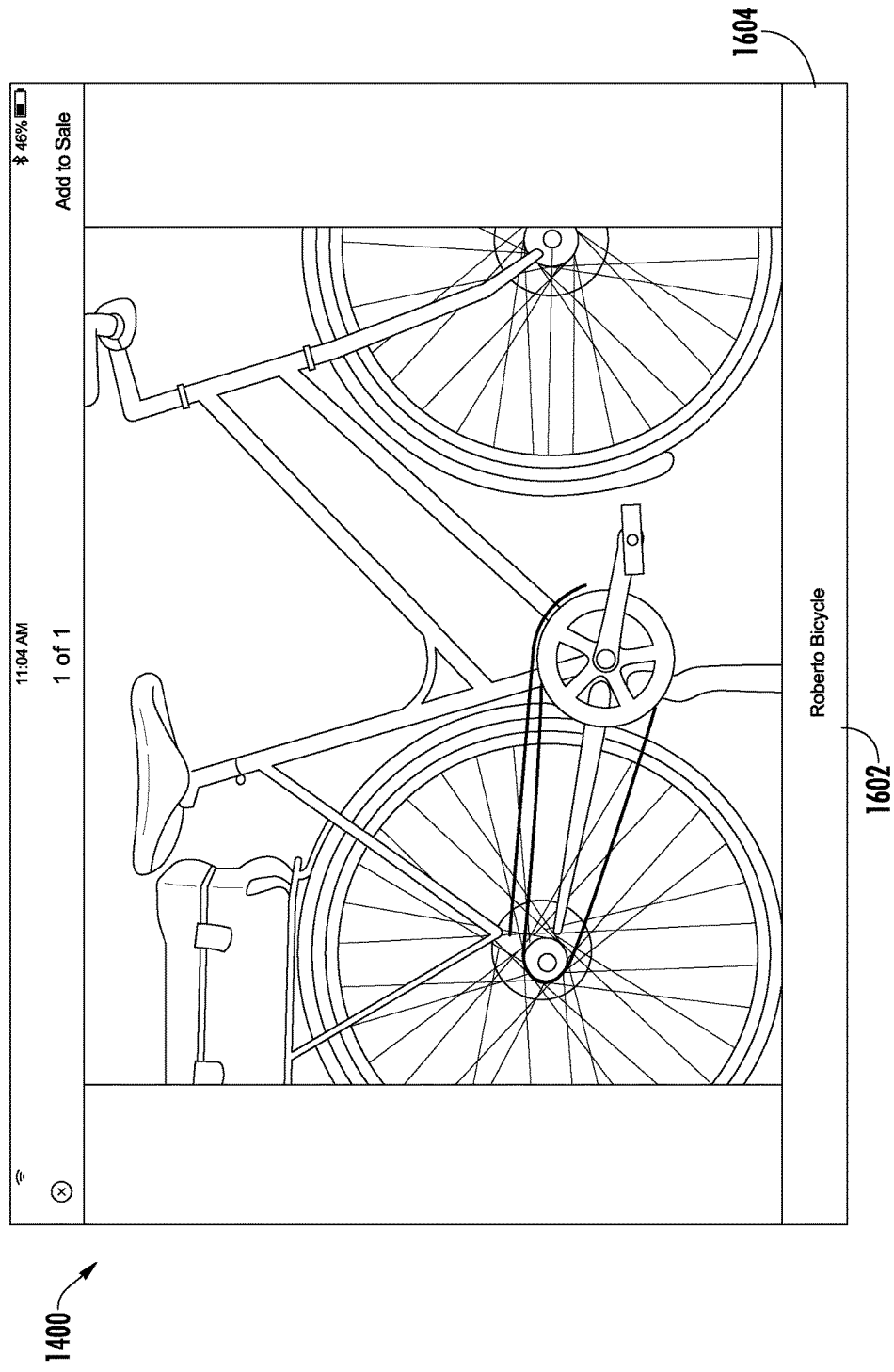
Figure 17:
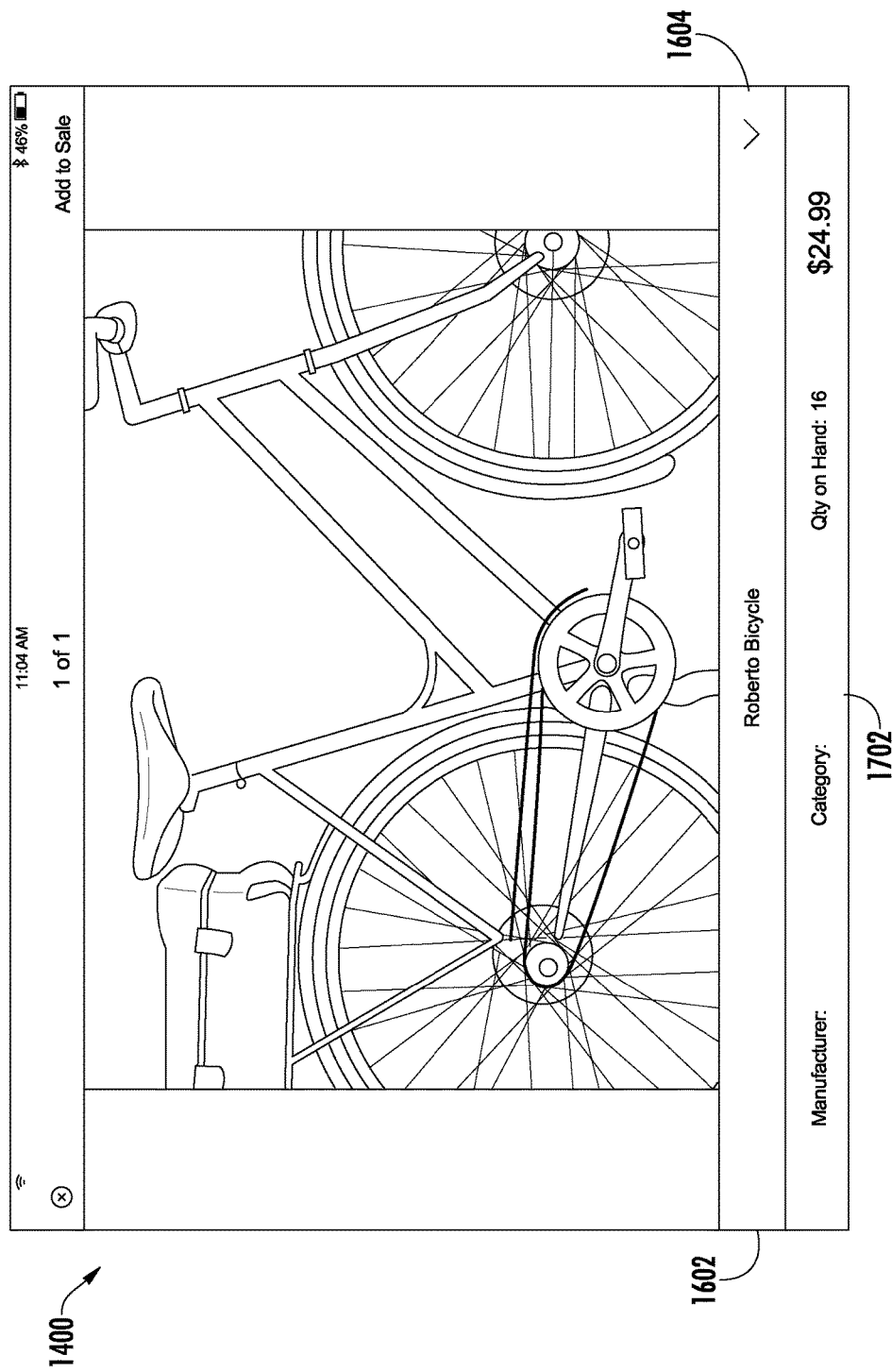

Referring back to FIG. 7, after the retrieved inventory items have been displayed in the point-of-sale graphical user interface, the method 700 advances to block 730 (see FIG. 8). In block 730, the point-of-sale computing device 102 determines whether the user has selected an inventory item. If so, the method 700 advances to block 732 in which the selected inventory item is expanded. For example, as shown in FIG. 16, the size of the image of the selected inventory item included in the inventory item display window (see FIG. 15) may be increased and the description of the inventory item may be displayed in a description window 1602. The user may expand the description window 1602 by selecting an expand icon 1604. In response, the point-of-sale computing device 102 may display additional sale information related to the selected inventory item in an information window 1702 as shown in FIG. 17. For example, the name of the manufacture, the category to which the inventory belongs, the quality on hand, the sale price, and/or other sale information may be displayed in the information window 1702.

Figure 18:
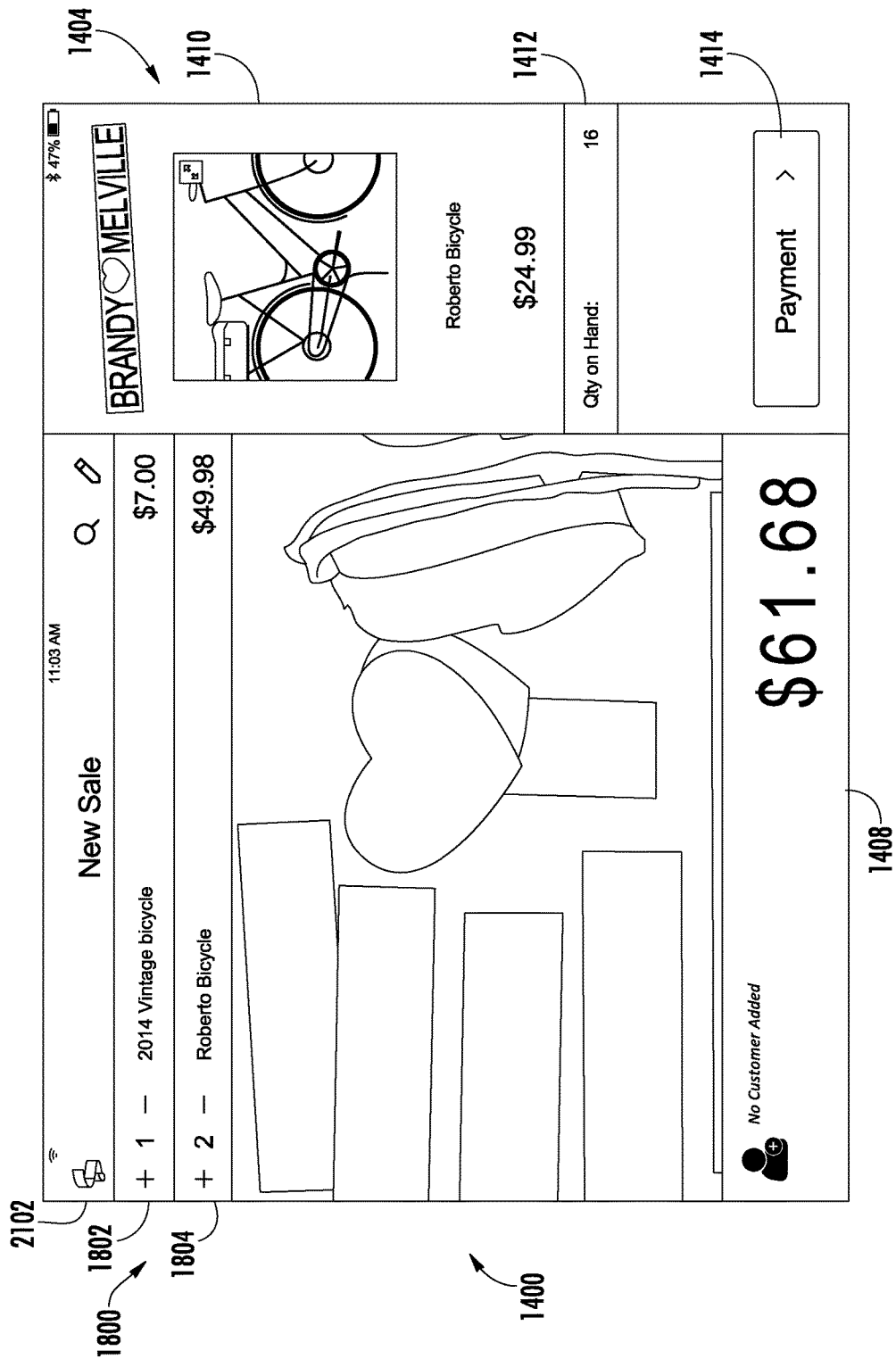

Referring now back to FIG. 8, after the selected inventory item has been expanded in block 732, the method 700 advances to block 734 in which the point-of-sale computing device 102 determines whether the user desires to purchase the selected inventory item. To do so, the user may select a purchase icon or widget from the point-of-sale graphical user interface. If so, the selected inventory item is added to the virtual shopping cart in block 736. For example, an illustrative virtual shopping cart 1800 is shown in FIG. 18. The illustrative virtual shopping cart 1800 includes an inventory item 1802 and an inventory item 1804, which list the description of the inventory items to be purchased along with their individual purchase price. The total amount of the selected inventory items for purchase (i.e., the total amount of the virtual shopping cart 1800) is displayed in the purchase total display window 1408 of the point-of-sale graphical user interface 1400.

Referring again back to FIG. 8, after the selected item has been added to the virtual shopping cart in block 736 or if the user decides not to purchase the selected item in block 734, the method 700 advances to block 738. In block 738, the point-of-sale computing device 102 determines whether the user desires to search for inventory items related to the selected inventory item. If so, the method 700 advances to block 740 in which inventory items determined to be related to the selected inventory item is retrieved from the point-of-sale server 104. To do so, as discussed above, the point-of-sale server 104 may identify related items based on the data tag information associated with the selected inventory item and the data tag information associated with each other inventory item. For example, in block 742, the point-of-sale computing device 102 may receive inventory items determined to be related to the selected inventory items based on relational data tag(s) associated with the selected inventory item. That is, the point-of-sale server 104 may search for related inventory items based on one or more relational data tags associated with the selected inventory item. Additionally or alternatively, in block 744, the point-of-sale computing device 102 may receive inventory items determined to be related to the selected inventory items based on description data tag(s) associated with the selected inventory item. That is, the point-of-sale server 104 may search for related inventory items based on one or more description data tags associated with the selected inventory item. Regardless, in block 746, the related inventory items are displayed to the user of the point-of-sale computing device 102 on the display 216. The related inventory items may be displayed to the user in a manner similar to the browse results as shown and discussed above in regard to FIG. 15.

Figure 19:
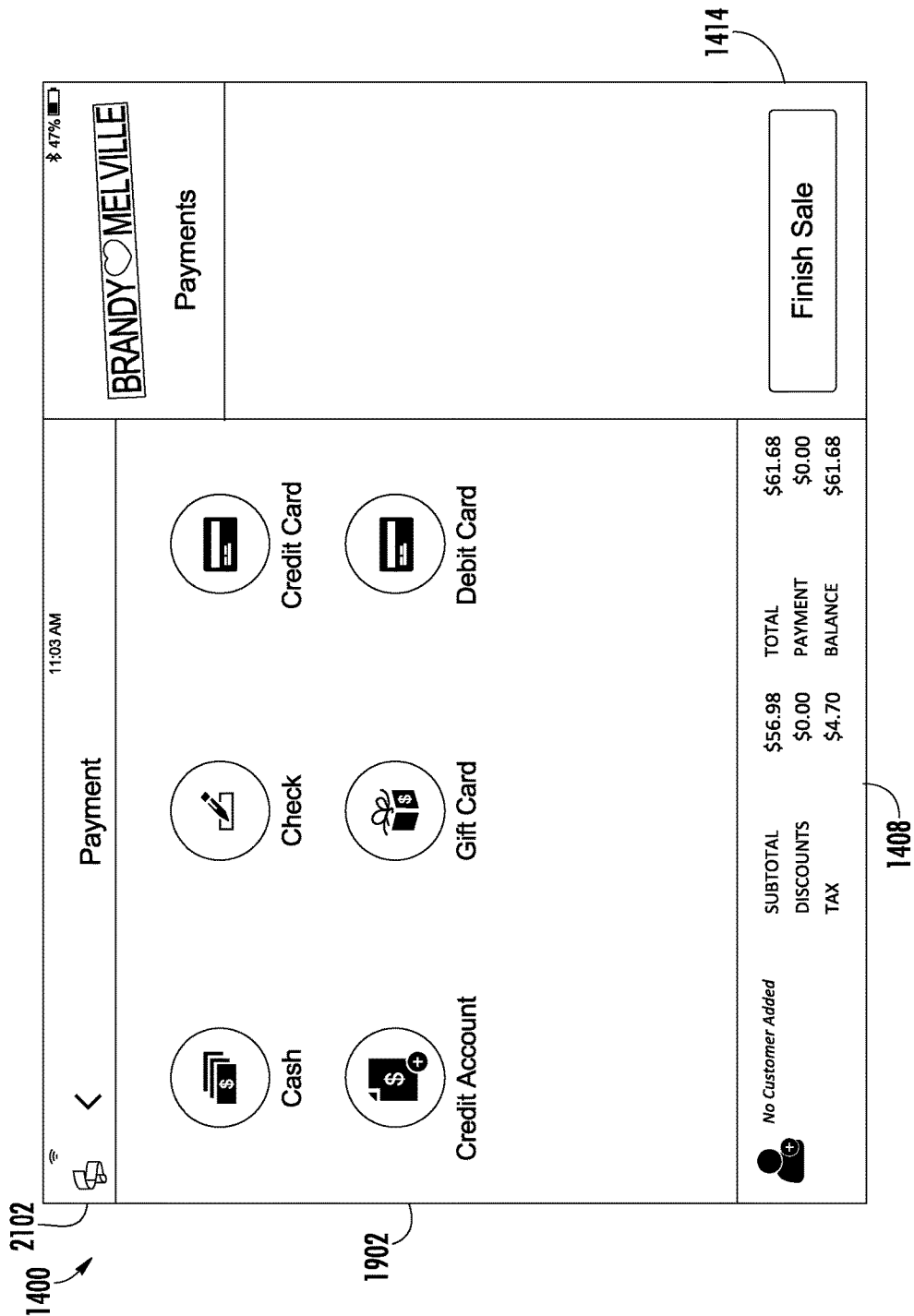

Referring back to block 730, if the user has not selected an inventory item, the method 700 advances to block 744 in which the point-of-sale computing device 102 determines whether the user desires to checkout (i.e., complete the sales transaction). If so, the method 700 advances to block 746 in which the sales transaction is completed. To do so, a payment window 1902, as shown in FIG. 19, may be displayed to the user of the point-of-sale computing device 102 via the point-of-sale graphical user interface 1400. The illustrative payment window 1902 includes a plurality of payment options for payment of the purchase price. Of course, in other embodiments, additional or other payment options may be provided.

Figure 20:
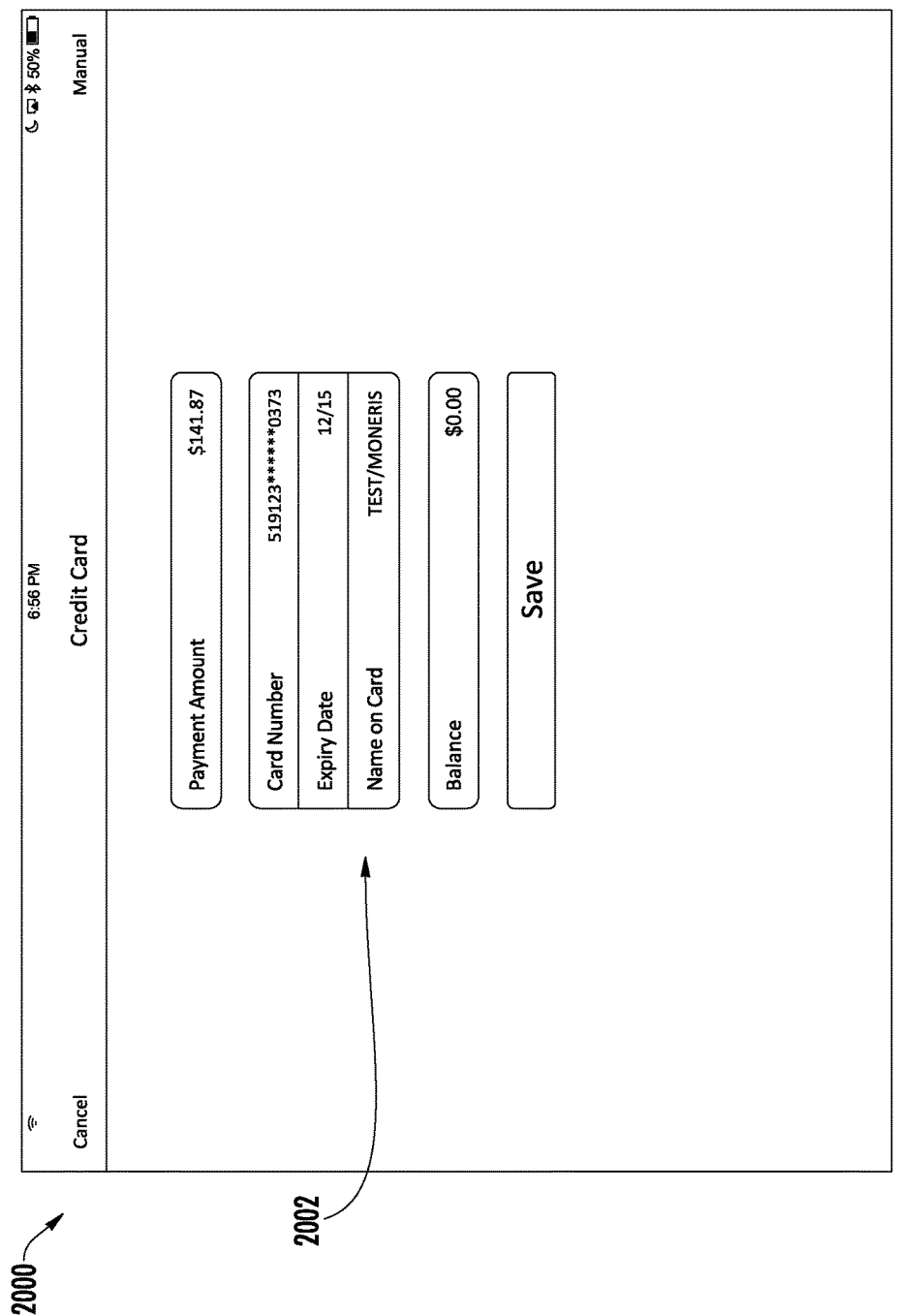

In some embodiments, the point-of-sale computing device 102 may display a credit card or other payment window in response to a credit card swipe detected while an active sale is in progress. An illustrative card window 2000 is shown in FIG. 20. As shown, the card window 2000 includes card details 2002, which may be automatically populated with information supplied from a card reader of the point-of-sale computing device 102. The point-of-sale computing device 102 may display the card window 2000 automatically in response to a card swipe detected while an active sale is in progress, for example, while the point-of-sale computing device 102 is displaying the point-of-sale graphical user interface 1400 as shown in FIGS. 14, 15, 18, and/or 19. The point-of-sale computing device 102 may display the card window 2000 without requiring the user to select a payment option from the payment window 1902 shown in FIG. 19. After displaying the card window 2000, the point-of-sale computing device 102 may complete the sales transaction as described above.

Figure 21:
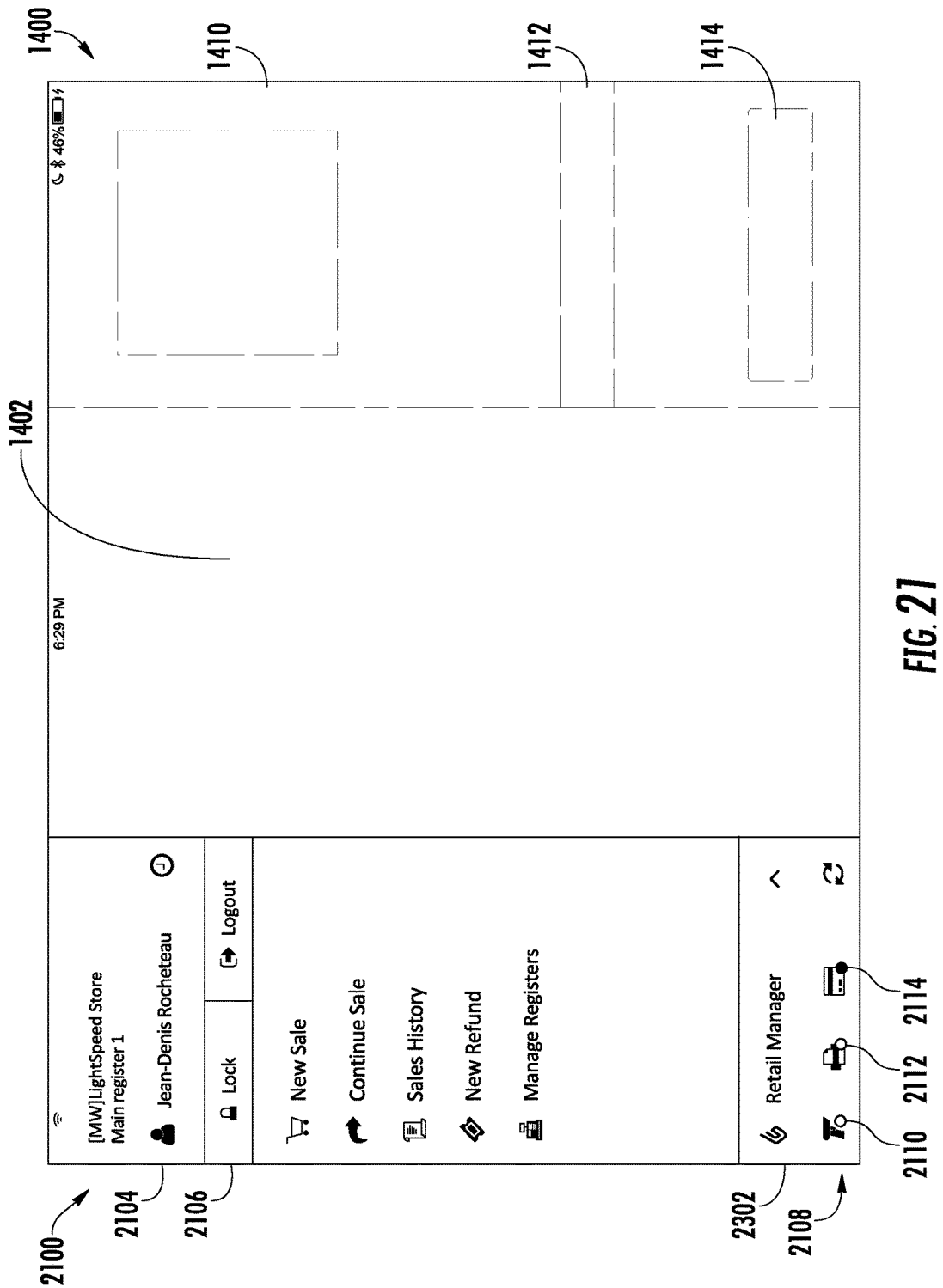

Referring now to FIG. 21, in some embodiments the point-of-sale computing device 102 may display a management window 2100. As shown, the management window 2100 may be displayed over the point-of-sale graphical user interface 1400. In some embodiments, as shown, the point-of-sale graphical user interface 1400, including the inventory display window 1410, the quantity-on-hand display window 1412, and the payment window 1414, may be blurred to increase visibility of the management window 2100. The management window 2100 may be displayed in response to the user of the point-of-sale computing device 102 selecting a management window disclosure button 2102, which is illustrated in FIGS. 14, 15, 18, 19, and 24.

The management window 2100 further includes a user identification window 2104 and a lock button 2106. The user identification window 2104 identifies the user or user account that is currently logged in or otherwise active on the point-of-sale computing device 102. The illustrative user identification window 2104 includes an icon and the name of the current user. Of course, the user identification window 2104 may additionally or alternatively include other user identification information.

Figure 22:
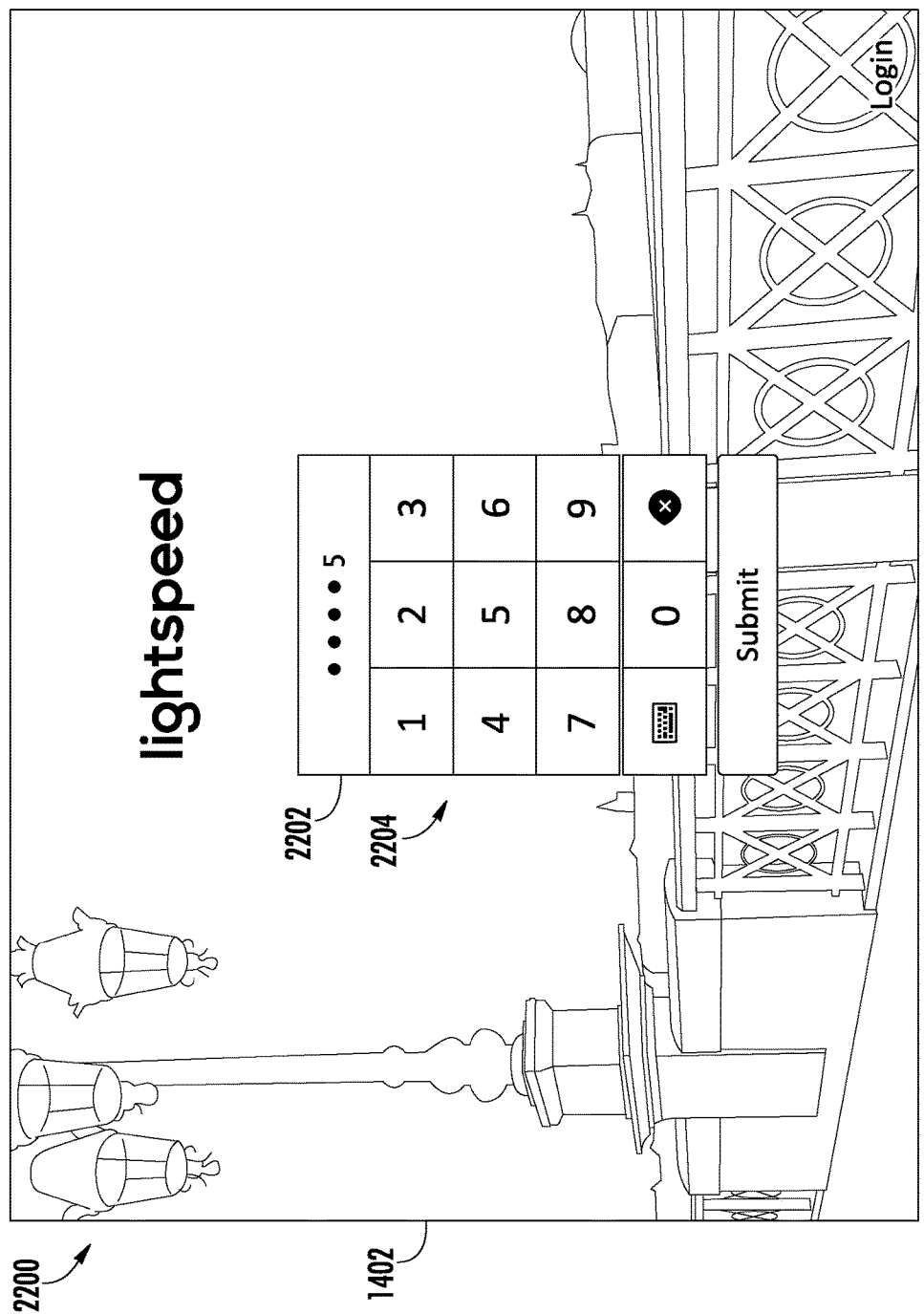

When the user selects the lock button 2106, the point-of-sale computing device 102 displays a lock screen 2200, illustratively shown in FIG. 22. As illustrated, the lock screen 2200 may include the branded background image 1402, but does not include other elements of the point-of-sale graphical user interface 1400 (e.g., the lock screen 2200 does not include the purchase total display window 1408, the inventory display window 1410, the quantity-on-hand display window 1412, and/or the payment window 1414). Thus, the lock screen 2200 may protect the security, privacy, and/or integrity of the point-of-sale computing device 102. The lock screen 2200 further includes a personal identification number (PIN) window 2202 and a PIN pad 2204. The user of the point-of-sale computing device 102 may enter his or her PIN into the PIN window 2202 using the PIN pad 2204. If the PIN is entered correctly, the point-of-sale device computing 102 closes the lock screen 2200, for example returning to the point-of-sale graphical user interface 1400. In some embodiments, the user may enter a more complicated password or other user credentials by selecting an onscreen keyboard or other input method.

Additionally or alternatively, in some embodiments the point-of-sale computing device 102 may support fast user switching from the lock screen 2200. After receiving a PIN entered by the user in the PIN window 2202, the point-of-sale computing device 102 may check the PIN against saved PINs of some or all user accounts of the point-of-sale computing device 102. If the entered PIN matches the PIN of a user account other than the currently active user account, the point-of-sale computing device 102 switches to the new user account prior to closing the lock screen 2200. For example, referring again to FIG. 21, after closing the lock screen 2200, the user identification window 2104 may identify the name or other identifying information associated with the new user account. Thus, the point-of-sale computing device 102 may allow the user account to be quickly and easily changed, even during execution of a sales transaction. Although described as providing fast user switching based on a PIN entered by the user, in some embodiments the point-of-sale computing device 102 may support fast user switching based on an alphanumeric password or other user credentials entered by the user from the lock screen 2200.

Referring back to FIG. 21, the management window 2100 also includes several hardware status icons 2108. For example, the illustrative management window 2100 includes hardware status icons 2108 for a barcode scanner, a printer, and a card reader. Each hardware status icon 2108 has an associated status indicator used to indicate whether the particular hardware device is currently connected to the point-of-sale computing device 102. For example, the illustrative status indicators 2110, 2112 indicate that the barcode scanner and the printer, respectively, are not connected to the point-of-sale computing device 102. The illustrative status indicator 2114 indicates that the bar code reader is currently connected to the point-of-sale computing device 102. Although illustrated as color-coded circular icon badges, it should be understood that the status indicators may be embodied as any appropriate indicia observable by the user (e.g., text, icons, colors, sounds, etc.).

Figure 23:
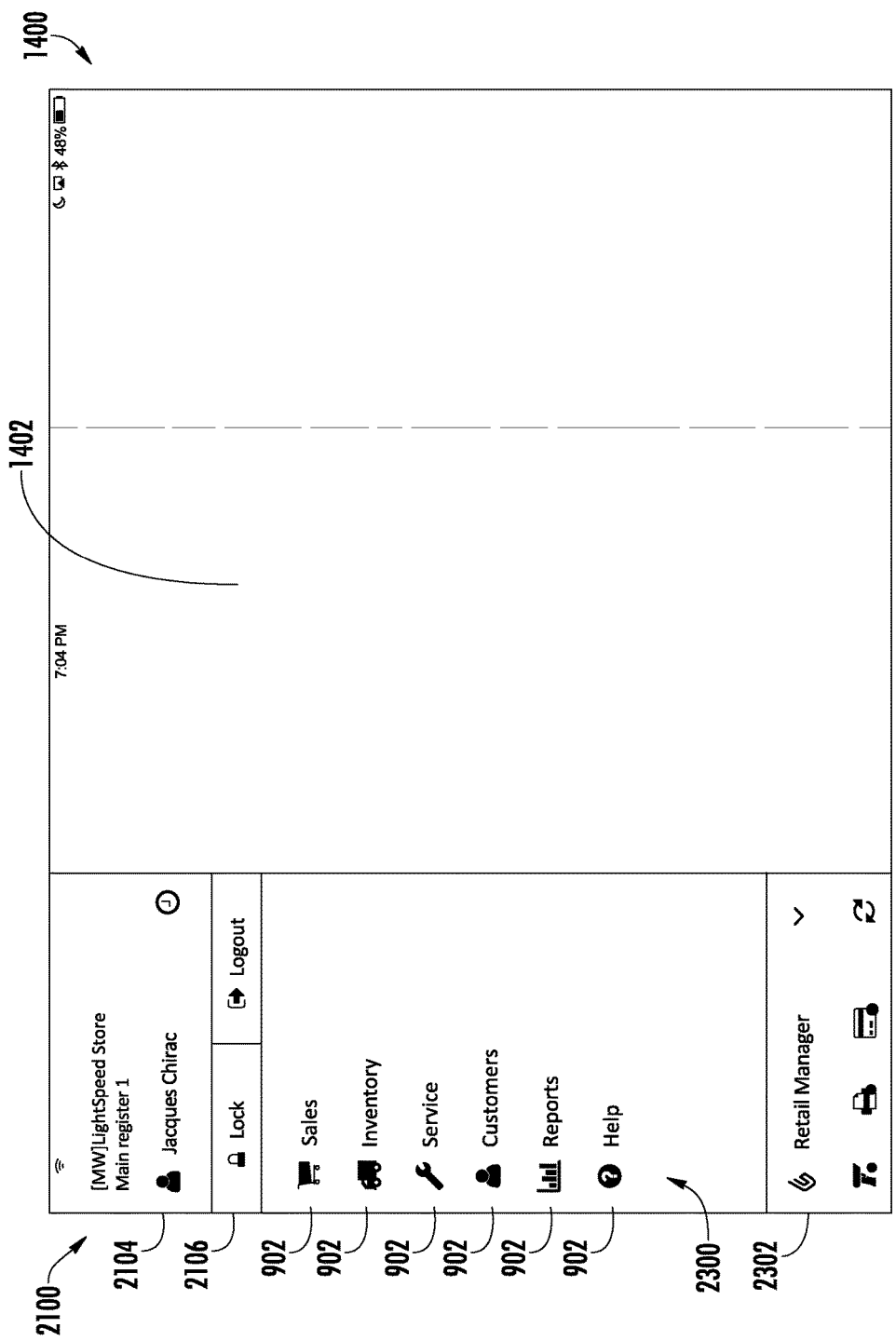

Referring now to FIG. 23, in some embodiments the point-of-sale computing device 102 may display a retail manager menu 2300. As shown, the retail manager menu 2300 is illustratively displayed within the management window 2100. The retail management menu 2300 may be displayed in response to the user selecting the retail manager disclosure button 2302, which is also shown in FIG. 21.

As shown in FIG. 23, the retail management menu 2300 includes several option buttons or widgets 902, each of which may be selected by the user to perform various management operations. The retail management menu 2300 may include some or all of the same widgets 902 provided by the management interface 900 described above in connection with FIG. 9. The particular widgets included in the retail management menu 2300 may depend on the currently active user displayed in the user identification window 2104. In particular, certain users may have restricted access to certain management widgets 902. For example, as shown in FIG. 23, a non-management employee (e.g., a sales associate) may have access to a sales widget, an inventory widget, a service widget, a customers widget, a reports widget, and a help widget, but may not have access to a web store widget or a settings widget.

Figure 24:
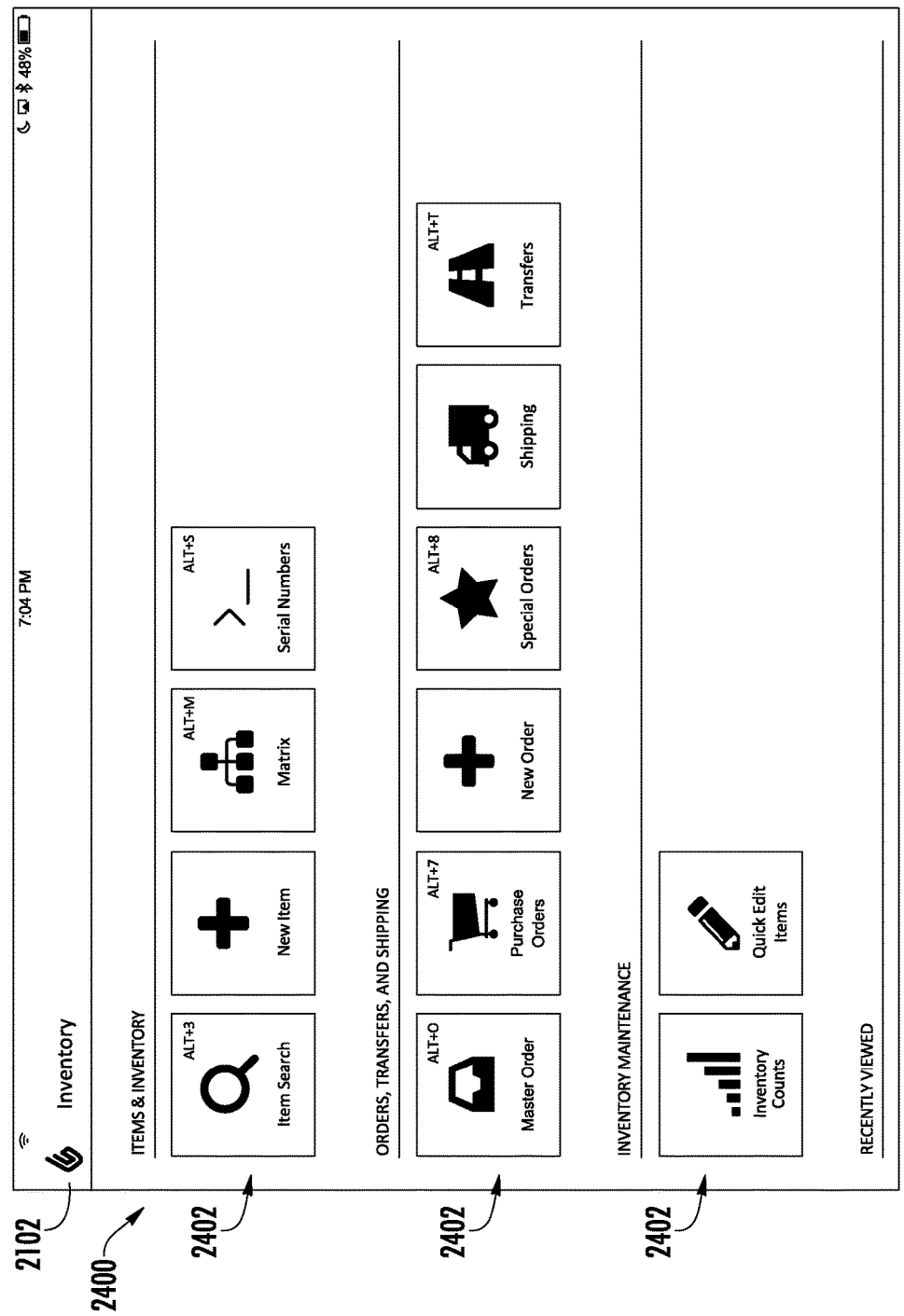

In response to the user selecting a widget 902, the point-of-sale computing device 102 activates a communication bridge between native content for the point-of-sale computing device 102 and web-based content, for example received from the point-of-sale server 104. The point-of-sale computing device 102 receives the web-based content and embeds or otherwise displays the web content within a native user interface. The point-of-sale computing device 102 may adapt the web content for display on the point-of-sale computing device 102. By doing so, the web content may benefit from full hardware acceleration on the point-of-sale computing device 102. Additionally, the communication bridge causes actions realized from a web view to be reflected in native views, and vice versa. For example, if the user selects the inventory widget 902, the point-of-sale computing device 102 may load an associated inventory web view 2400 as shown in FIG. 24. The inventory web view 2400 includes several elements 2402 which may be selected by the user to perform inventory management tasks. For example, the user may update inventory items of the retailer as described above in connection with FIG. 6. Actions performed by the user in the inventory web view 2400 are reflected in the native user interface, for example in the point-of-sale graphical user interface 1400. The user may select the management window disclosure button 2102 to display the management window 2100 and return to the point-of-sale graphical user interface 1400.

Figure 25:
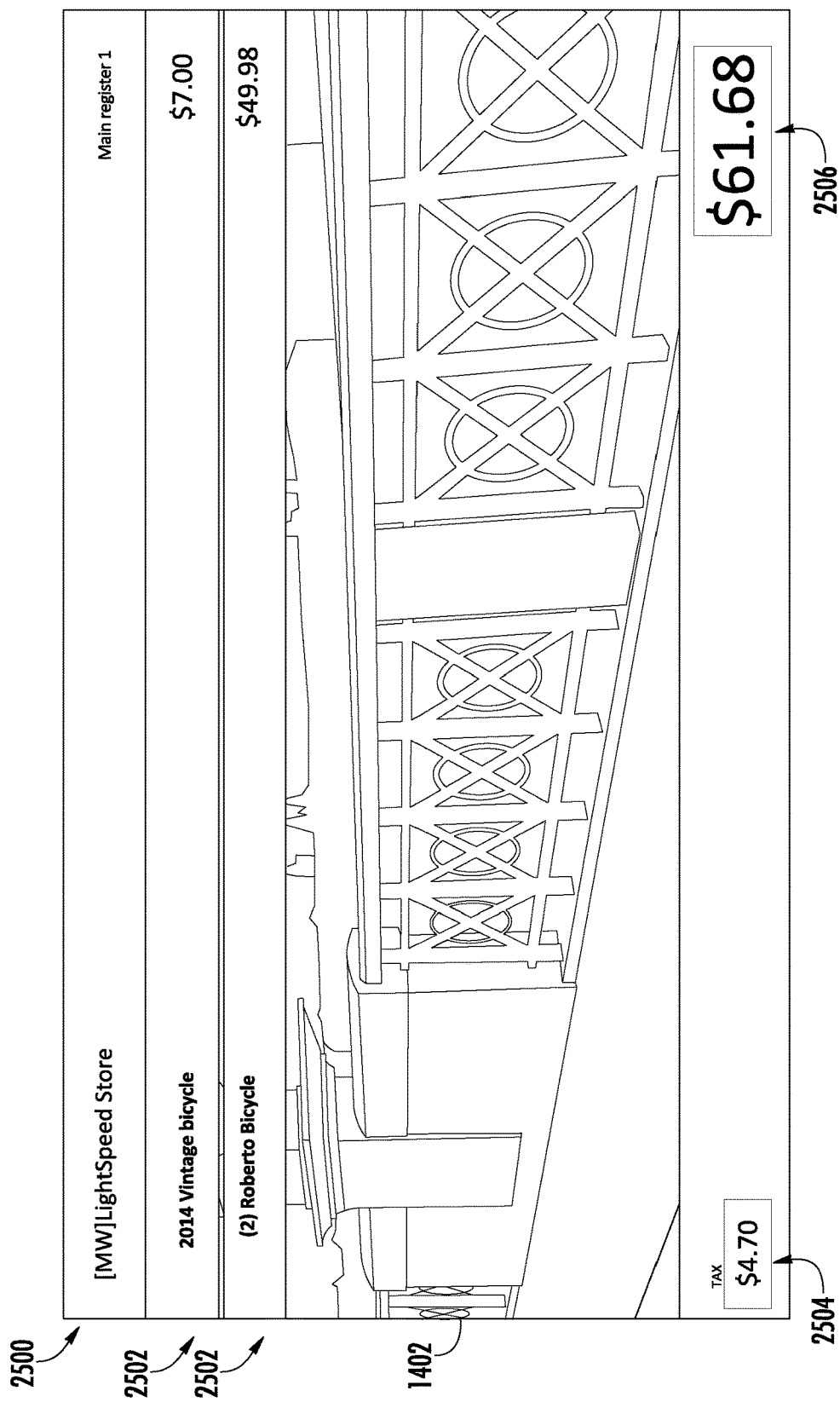

Referring now to FIG. 25, in some embodiments, the point-of-sale computing device 102 may present a customer-facing display interface 2500 on a customer-facing display device. The customer-facing display device may be embodied as any type of display coupled to the point-of-sale computing device 102 that is capable of displaying digital information, such as a liquid crystal display (LCD), a light emitting diode (LED), a plasma display, a cathode ray tube (CRT), or other type of display device. In some embodiments, the customer-facing display device may be embodied as a touchscreen display to facilitate user interaction with a customer. In use, as shown in FIG. 25, the customer-facing display interface 2500 may include the branded background image 1402 and a number of user interface elements overlaid on top of the branded background image 1402.

The customer-facing display interface 2500 may include user interface elements similar to the virtual shopping cart 1800 described above in connection with FIG. 18. For example, the illustrative customer-facing display interface 2500 includes two inventory items 2502, which list a description of the inventory items to be purchased along with their individual purchase price. Unlike the virtual shopping cart 1800, however, the inventory items 2502 of the customer-facing display interface 2500 may not allow the customer to modify the items purchased. The illustrative customer-facing display interface 2500 further includes a tax display window 2504 and a purchase total display window 2506, which display the tax and total purchase price for the current sales transaction, respectively.

Figure 26:
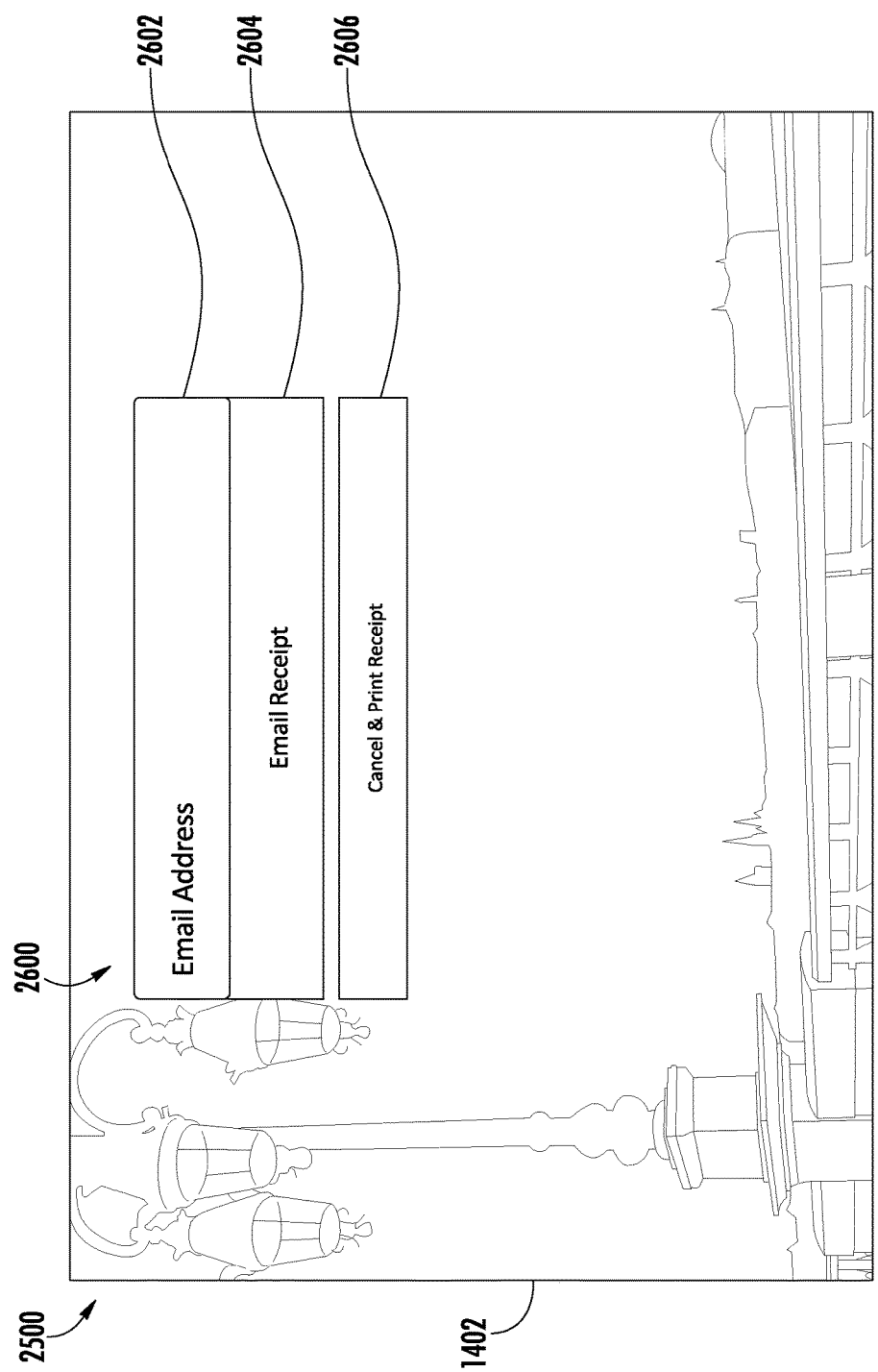

Additionally or alternatively, the customer-facing display interface 2500 may provide one or more interactive interfaces to receive input from the customer. For example, as shown in FIG. 26, the customer-facing display interface 2500 may include a receipt interface 2600. The receipt interface 2600 allows the point-of-sale computing device 102 to capture the customer's email address, which may be used to transmit a sales receipt. The illustrative receipt interface 2600 includes an email address entry field 2602, an email command button 2604, and a cancel button 2606. The point-of-sale computing device 102 may transmit an email receipt to the email address included in the email address entry field 2602 in response to the customer selecting the email command button 2604. The point-of-sale computing device 102 may instead print a paper receipt using a connected printer in response to the customer selecting the cancel button 2606. Of course, the customer-facing display interface 2500 may also include additional interactive interfaces, such as a signature interface to capture a card authorization signature from the customer.

Figure 27:
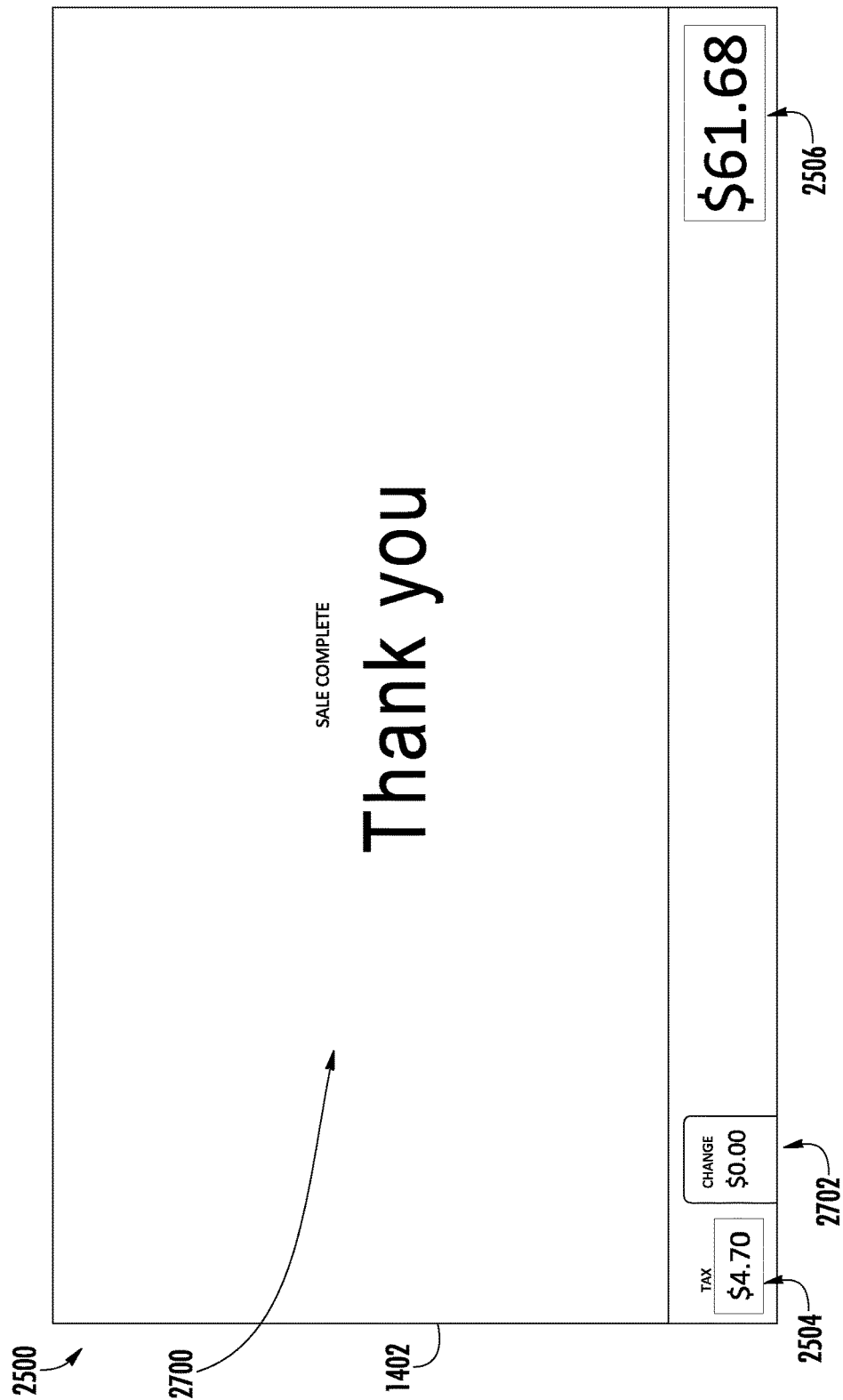

In some embodiments, the customer-facing display interface 2500 may include a sale completed interface 2700 as illustrated in FIG. 27. As shown, the sale completed interface 2700 may indicate to the customer that the sale has been successfully completed using a text message or other appropriate technique. The sale completed interface 2700 may also display information relevant to the completed sales transaction. For example, the illustrative sale completed interface 2700 includes a change display window 2702 that displays the amount of change due to the user. The sale completed interface 2700 may also include some or all elements included in the customer-facing display interface 2500, such as the tax display window 2504 and/or the purchase total display window 2506. As shown, the sale completed interface 2700 may be overlaid over the branded background image 1402, and the branded background image 1402 may be blurred to improve readability and to visually indicate that the sales transaction has been completed.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A mobile point-of-sale computing device for conducting a sales transaction, the mobile point-of-sale computing device comprising:
   a display;
   a background display module to display a branded background image on the display, the branded background image being associated with a business entity conducting the sales transaction;
   an overlay display module to display a point-of-sale user interface overlaid on the branded background image, wherein the point-of-sale user interface is usable to conduct a sales transaction and includes a plurality of semi-transparent display windows, wherein a portion of the branded background image is visible through each of the semi-transparent display windows; and a background blur module to determine whether to blur corresponding portions of the branded background image covered by each semitransparent display window of the plurality of semitransparent display windows as a function of information displayed in each corresponding semitransparent display window and to blur a portion of the branded background image covered by a first semitransparent display window of the plurality of the semitransparent display windows in response to a determination, based on the information displayed in the first semitransparent display window, to blur the portion of the branded background image covered by the first semitransparent display window to increase the visibility of the information included in the first semitransparent display window.

2. The mobile point-of-sale computing device of claim 1, further comprising a communication module to retrieve the branded background image from a point-of-sale server over a network.

3. The mobile point-of-sale computing device of claim 1, wherein the background display module is further to display a logo image of the business entity in the first semitransparent display window, wherein the background blur module is to blur the portion of the branded background image covered by the first semitransparent display window in response to a determination that the first semitransparent display window includes the logo image.

4. The mobile point-of-sale computing device of claim 1, further comprising a point-of-sale control module to:
  display, on the point-of-sale graphical user interface, a plurality of inventory items on the available for purchase on the display of the mobile point-of-sale computing device;
  receive a selection of an inventory item for purchase via the point-of-sale graphical user interface; and
  add the selected inventory item to a virtual shopping cart.

5. The mobile point-of-sale computing device of claim 4, wherein the point-of-sale control module is further to:
  initiate a search for additional inventory items related to the selected inventory item based on a data tag associated with the selected inventory item, and
  display, on the point-of-sale graphical user interface, additional inventory items identified by the search for additional inventory items related to the selected inventory item.

6. The mobile point-of-sale computing device of claim 5, wherein the data tag comprises a relational data tag that identifies other inventory items that have been determined to be related to the selected inventory item, and
  wherein to search for additional inventory items comprises to search for additional inventory items identified by the relational data tag of the selected inventory item.

7. The mobile point-of-sale computing device of claim 5, wherein the data tag comprises a description data tag that defines characteristics of the selected inventory item, and
  wherein to search for additional inventory items comprises to search for additional inventory items having associated description data tags defining characteristics that match the characteristics of the selected inventory item as defined by the description data tag of the selected inventory item.

8. The mobile point-of-sale computing device of claim 1, further comprising a point-of-sale module to:

display a lock screen on the display of the mobile point-of-sale computing device, wherein the lock screen obscures the point-of-sale user interface;
receive a personal identification number from a user of the mobile point-of-sale computing device in response to display of the lock screen; and
activate a user account associated with the personal identification number in response to receipt of the personal identification number.

9. The mobile point-of-sale computing device of claim 1, further comprising a point-of-sale module to:
  receive a web-based inventory management interface from a point-of-sale server over a network; and
  embed the web-based inventory management interface in the point-of-sale user interface with a communication bridge between web-based content and native content of the mobile point-of-sale computing device.

10. The mobile point-of-sale computing device of claim 1, further comprising
  a customer-facing display; and
  a point-of-sale module to display a customer-facing user interface on the customer-facing display, wherein the customer-facing user interface is overlaid on the branded background image, and wherein the customer-facing display is usable to conduct the sales transaction.

11. A method for conducting a sales transaction on a mobile point-of-sale computing device, the method comprising:
  displaying, by the mobile point-of-sale computing device, a branded background image on a display of the mobile point-of-sale computing device, the branded background image being associated with a business entity conducting the sales transaction;
  displaying, by the mobile point-of-sale computing device, a point-of-sale user interface overlaid on the branded background image, wherein the point-of-sale user interface is usable to conduct a sales transaction and includes a plurality of semi-transparent display windows, wherein a portion of the branded background image is visible through each of the semi-transparent display windows;
  determining, by the mobile point-of-sale computing device, whether to blur corresponding portions of the branded background image covered by each semitransparent display window of the plurality of semitransparent display windows as a function of information displayed in each corresponding semitransparent display window; and
  blurring, by the mobile point-of-sale computing device, a portion of the branded background image covered by a first semitransparent display window of the plurality of the semitransparent display windows in response to a determination, based on the information displayed in the first semitransparent display window, to blur the portion of the branded background image covered by the first semitransparent display window to increase the visibility of the information included in the first semi-transparent display window.

12. The method of claim 11, wherein displaying the background image comprises retrieving the branded background image from a point-of-sale server over a network.

13. The method of claim 11, further comprising:
  displaying, by the point-of-sale graphical user interface, a plurality of inventory items available for purchase on the display of the mobile point-of-sale computing device;

receiving a selection of an inventory item for purchase; and adding the selected inventory item to a virtual shopping cart.

14. The method of claim 13, further comprising:

searching for additional inventory items related to the selected inventory item based on a data tag associated with the selected inventory item, and displaying, on the mobile point-of-sale computing device, additional inventory items identified by the search for additional inventory items related to the selected inventory item.

15. The method of claim 11, further comprising:

displaying, by the mobile point-of-sale computing device, a lock screen on the display of the mobile point-of-sale computing device, wherein the lock screen obscures the point-of-sale user interface;

receiving, by the mobile point-of-sale computing device, a personal identification number from a user of the mobile point-of-sale computing device in response to displaying the lock screen; and activating, by the mobile point-of-sale computing device, a user account associated with the personal identification number in response to receiving the personal identification number.

16. The method of claim 11, further comprising:

receiving, by the mobile point-of-sale computing device, a web-based inventory management interface from a point-of-sale server over a network; and embedding, by the mobile point-of-sale computing device, the web-based inventory management interface in the point-of-sale user interface using a communication bridge between web-based content and native content of the mobile point-of-sale computing device.

17. The method of claim 11, further comprising:

displaying, by the mobile point-of-sale computing device, a customer-facing user interface on a customer-facing display of the mobile point-of-sale computing device, wherein the customer-facing user interface is overlaid on the branded background image, and wherein the customer-facing display is usable to conduct the sales transaction.

18. One or more non-transitory, machine-readable storage media comprising a plurality of instructions stored thereon that, in response to execution, cause a mobile point-of-sale computing device to:

display a branded background image on a display of the mobile point-of-sale computing device, the branded background image being associated with a business entity conducting the sales transaction;

display a point-of-sale user interface overlaid on the branded background image, wherein the point-of-sale user interface is usable to conduct a sales transaction and includes a plurality of semi-transparent display windows, wherein a portion of the branded background image is visible through each of the semi-transparent display windows;

determine, by the mobile point-of-sale computing device, whether to blur corresponding portions of the branded background image covered by each semitransparent display window of the plurality of semitransparent display windows as a function of information displayed in each corresponding semitransparent display window; and blur a portion of the branded background image covered by a first semitransparent display window of the plurality of the semitransparent display windows in response to a determination, based on the information displayed in the first semitransparent display window, to blur the portion of the branded background image covered by the first semitransparent display window to increase the visibility of the information included in the first semitransparent display window.

19. The one or more non-transitory, machine-readable storage media of claim 18, wherein to display the branded background image comprises to retrieve the branded background image from a point-of-sale server over a network.

20. The one or more non-transitory, machine-readable storage media of claim 18, wherein the plurality of instructions further cause the mobile point-of-sale computing device to display a logo image of the business entity in the first semitransparent display window, wherein the background blur module is to blue the portion of the branded background image covered by the first semitransparent display window in response to a determination that the first semitransparent display window includes the logo image.

21. The one or more non-transitory, machine-readable storage media of claim 18, wherein the plurality of instructions further cause the mobile point-of-sale computing device to:

display, by the point-of-sale graphical user interface, a plurality of inventory items available for purchase on the display of the mobile point-of-sale computing device;

receive a selection of an inventory item for purchase; and add the selected inventory item to a virtual shopping cart.

22. The one or more non-transitory, machine-readable storage media of claim 21, wherein the plurality of instructions further cause the mobile point-of-sale computing device to:

search for additional inventory items related to the selected inventory item based on a data tag associated with the selected inventory item, and display, on the mobile point-of-sale computing device, additional inventory items identified by the search for additional inventory items related to the selected inventory item.

23. The one or more non-transitory, machine-readable storage media of claim 18, wherein the plurality of instructions further cause the mobile point-of-sale computing device to:

display a lock screen on the display of the mobile point-of-sale computing device, wherein the lock screen obscures the point-of-sale user interface;

receive a personal identification number from a user of the mobile point-of-sale computing device in response to displaying the lock screen; and activate a user account associated with the personal identification number in response to receiving the personal identification number.

24. The one or more non-transitory, machine-readable storage media of claim 18, wherein the plurality of instructions further cause the mobile point-of-sale computing device to:

receive a web-based inventory management interface from a point-of-sale server over a network; and embed the web-based inventory management interface in the point-of-sale user interface using a communication bridge between web-based content and native content of the mobile point-of-sale computing device.

25. The one or more non-transitory, machine-readable storage media of claim 18, wherein the plurality of instructions further cause the mobile point-of-sale computing device to:

display a customer-facing user interface on a customer-facing display of the mobile point-of-sale computing device, wherein the customer-facing user interface is overlaid on the branded background image, and wherein the customer-facing display is usable to conduct the sales transaction.

* * * * *